(12) United States Patent
Rueckriemen

(10) Patent No.: US 12,273,467 B2
(45) Date of Patent: Apr. 8, 2025

(54) CREATING A VEHICLE CERTIFICATE USING A BLOCKCHAIN

(71) Applicant: Bundesdruckerei GMBH, Berlin (DE)

(72) Inventor: Joerg Rueckriemen, Berlin (DE)

(73) Assignee: Bundesdruckerei GmbH, Berlin (DE)

( * ) Notice: Subject to any disclaimer, the term of this patent is extended or adjusted under 35 U.S.C. 154(b) by 572 days.

(21) Appl. No.: 17/253,979

(22) PCT Filed: Jun. 25, 2019

(86) PCT No.: PCT/EP2019/066851
§ 371 (c)(1),
(2) Date: Dec. 18, 2020

(87) PCT Pub. No.: WO2020/002340
PCT Pub. Date: Jan. 2, 2020

(65) Prior Publication Data
US 2021/0273819 A1    Sep. 2, 2021

(30) Foreign Application Priority Data

Jun. 26, 2018  (DE) .................. 10 2018 115 347.3

(51) Int. Cl.
*H04L 9/32*         (2006.01)
*G06F 16/23*       (2019.01)
(Continued)

(52) U.S. Cl.
CPC ........ *H04L 9/3268* (2013.01); *G06F 16/2379* (2019.01); *G06Q 30/018* (2013.01);
(Continued)

(58) Field of Classification Search
None
See application file for complete search history.

(56) References Cited

U.S. PATENT DOCUMENTS 10,824,746 B1\* 11/2020 Magerkurth .......... G06F 21/602
2010/0306533 A1\* 12/2010 Phatak .................. H04L 63/107
713/168
(Continued)

FOREIGN PATENT DOCUMENTS

EP         3319006 A1    5/2018

OTHER PUBLICATIONS

Syed, T.A., Siddique, M.S., Nadeem, A., Alzahrani, A., Jan, S. and Khattak, M.A.K., 2020. A novel blockchain-based framework for vehicle life cycle tracking: An end-to-end solution. IEEE Access, 8, pp. 111042-111063. (Year: 2020).\*

(Continued)

*Primary Examiner* — Luu T Pham
*Assistant Examiner* — Edward X Long
(74) *Attorney, Agent, or Firm* — Harness, Dickey & Pierce, P.L.C.

(57) ABSTRACT

The method includes creating a signed output instruction for outputting a vehicle certificate, having a data record characterising the vehicle, using the blockchain, in the case of a valid signature, receiving the vehicle certificate, outputting the vehicle certificate, wherein the output vehicle certificate includes a machine-readable code, wherein the machine-readable code includes a private cryptographic key of an asymmetric key pair, wherein a public cryptographic key of the asymmetric key pair is identified in the blockchain as a check value for checking a signature of a read request for reading vehicle data of the vehicle certificate from the blockchain.

19 Claims, 15 Drawing Sheets

Figure 1A:
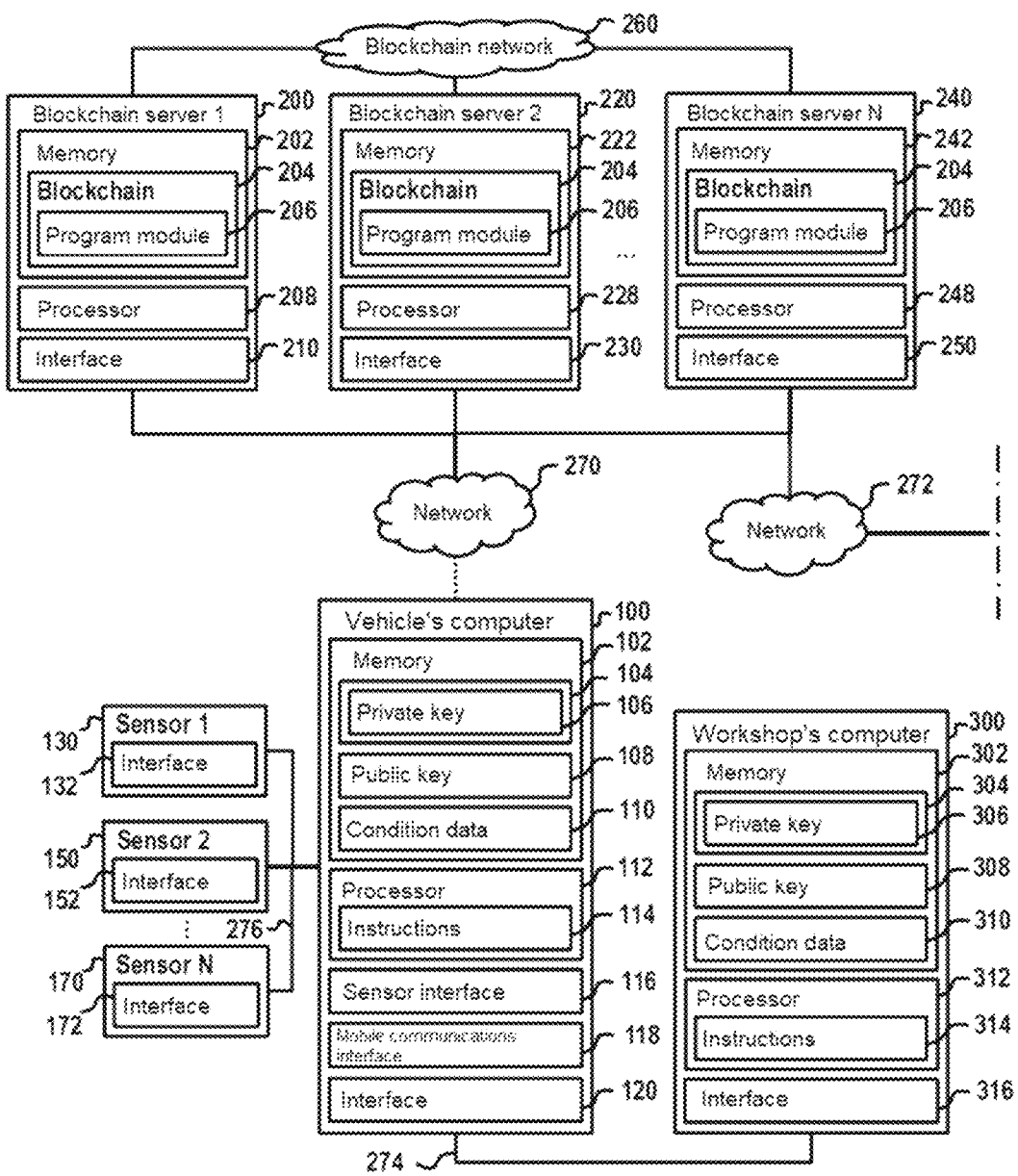

(51) Int. Cl.
  *G06Q 30/018*   (2023.01)
  *H04L 9/08*     (2006.01)
  *G06F 3/12*         (2006.01)
  *G06F 3/14*         (2006.01)
  *G06F 8/65*         (2018.01)
  *H04L 9/00*         (2022.01)

(52) U.S. Cl.
  CPC .......... *H04L 9/0894* (2013.01); *H04L 9/3247* (2013.01); *G06F 3/12* (2013.01); *G06F 3/14* (2013.01); *G06F 8/65* (2013.01); *H04L 9/50* (2022.05); *H04L 2209/84* (2013.01)

(56) References Cited

U.S. PATENT DOCUMENTS

| | | | | |
|---|---|---|---|---|
| 2016/0328890 | A1* | 11/2016 | Keane | G07C 5/008 |
| 2017/0011460 | A1* | 1/2017  | Molinari | H04L 9/3247 |
| 2018/0018723 | A1* | 1/2018  | Nagla | H04L 63/102 |
| 2019/0092279 | A1* | 3/2019  | Jarvis | H04L 9/3297 |
| 2019/0155594 | A1* | 5/2019  | Nakaguma | G06F 9/445 |
| 2019/0215163 | A1* | 7/2019  | Suleiman | G07C 9/00309 |

OTHER PUBLICATIONS

Baza, M., Sherif, A., Mahmoud, M.M., Bakiras, S., Alasmary, W., Abdallah, M. and Lin, X., 2021. Privacy-preserving blockchain-based energy trading schemes for electric vehicles. IEEE Transactions on Vehicular Technology, 70(9), pp. 9369-9384. (Year: 2021).*

International Search Report PCT/ISA/210 for International Application No. PCT/EP2019/066851 dated Sep. 4, 2019.

Written Opinion PCT/ISA/237 for International Application No. PCT/EP2019/066851 dated Sep. 4, 2019.

* cited by examiner

CREATING A VEHICLE CERTIFICATE USING A BLOCKCHAIN

CROSS-REFERENCE TO RELATED APPLICATIONS

This application is a national phase under 35 U.S.C. § 371 of PCT International Application No. PCT/EP2019/066851 which has an International filing date of Jun. 25, 2019, which claims priority to German Application No. 10 2018 115 347.3, filed Jun. 26, 2018, the entire contents of each of which are hereby incorporated by reference.

The invention relates to a method for creating a vehicle certificate using vehicle data saved in a tamper-proof manner in a blockchain and to a system for carrying out the method.

The identity of vehicles is generally proven by an official vehicle certificate, such as a registration certificate in the case of motor vehicles. Such registration certificates are generally protected by security features. However, these offer only limited protection, particularly in relation to the value of the vehicles to be protected.

There is also a risk that registration offices will become victims of theft, with blank registration certificate forms having been stolen. These registration certificates, for example, already bear a document serial number and are issued by vehicle thieves for the stolen vehicles.

The object of the invention is therefore to provide an efficient and secure method for the tamper-proof creation of a vehicle certificate for a vehicle.

The object underlying the invention is solved by the features of the independent claims. Embodiments of the invention are described in the dependent claims.

Embodiments include a method for the tamper-proof saving of vehicle data of a vehicle in a blockchain. The blockchain comprises, in one block, a program module with first and second program instructions. The program module is assigned to the vehicle. By executing the first program instructions, an entry which contains vehicle data of the vehicle and which is assigned to the program module is generated in the blockchain, and, by executing the second program instructions, a vehicle certificate containing a first data record characterising the vehicle is created. The first data record comprises vehicle data saved in an entry of the blockchain assigned to the program module. The program module is assigned to a first public cryptographic key of a first asymmetric key pair of a first vehicle owner and a private cryptographic key of the first asymmetric key pair is saved in a memory of a computer system of a first owner of the vehicle.

The method comprises:
creating an output instruction for outputting the vehicle certificate, wherein the output instruction identifies the program module assigned to the vehicle,
signing the output instruction with the first private cryptographic key, sending the signed output instruction by the computer system of the first owner via a first network to a blockchain server from a plurality of blockchain servers of the blockchain network configured to execute the program instructions of the program module,
receiving the signed output instruction by the blockchain server,
executing, by the blockchain server, the second program instructions of the program module identified by the output instruction, wherein the execution of the second program instructions comprises checking the signature of the output instruction using the first public cryptographic key and, in the case of a valid signature, creating the vehicle certificate,
sending the vehicle certificate through the blockchain server to the computer system of the first owner,
receiving the vehicle certificate by the computer system of the first owner,
outputting the vehicle certificate by the computer system of the first owner, wherein the output vehicle certificate comprises a machine readable code, wherein the machine-readable code identifying the program module assigned to the vehicle and comprises a second private cryptographic key of a second asymmetric key pair, wherein a second public cryptographic key of the second asymmetric key pair is identified in the blockchain as a check value for checking a signature of a read request for reading vehicle data of the vehicle certificate from the blockchain.

Embodiments may have the advantage of providing a method with which a vehicle owner registered in the blockchain may create a vehicle certificate as required. The authenticity of the vehicle data provided in the vehicle certificate is guaranteed by the blockchain, which enables tamper-proof saving of the vehicle data. Using the machine-readable code, the vehicle data of the vehicle certificate may be read from the blockchain by means of the read requests for reading vehicle data of the vehicle certificate. The authorisation to read the data of the vehicle certificate may be enabled by a signature with the second private key provided by the machine-readable code as signature key.

The machine-readable code may, for example, be a one- or two-dimensional graphic code which may be read by means of an optoelectronic reader. The code may comprise common characters, numerals and/or special characters. The code may also comprise geometric shapes such as lines and dots of different dimensions.

The code may, for example, be a one-dimensional barcode, a stacked one-dimensional barcode, an array code such as a matrix code, e.g. a QR code, or a dot code. It may also be a composite code, such as a double code. A double code, for example, consists of a linear barcode and an additional two-dimensional code. It may also be a one-dimensional barcode, which additionally uses the second dimension in the form of bars of different lengths for coding. Higher-dimensional codes with three or more dimensions may also be implemented, for example by using different colours.

The machine-readable code may also be data saved in a memory, such as a chip or an RFID tag, which may be read by a reader.

A "vehicle" is understood here to be a mobile means of transport. Such a means of transport may be used, for example, to transport goods (freight transport), tools (machines or aids) or people (passenger transport). Vehicles include, in particular, motorised means of transport. A vehicle may be, for example, a land vehicle, a watercraft and/or an aircraft. A land vehicle may be, for example: an automobile, such as a passenger car, bus or lorry; a motorised two-wheeler, such as a motorbike, moped, scooter or motor-assisted bicycle; an agricultural tractor, forklift truck, golf cart, or mobile crane. In addition, a land vehicle may also be a rail-bound vehicle. A watercraft may be, for example, a ship or boat. It may also be an aircraft, such as a plane or helicopter. In particular, a vehicle is also understood to be a motor vehicle.

A "blockchain" is understood here and in the following to be an ordered data structure which comprises a plurality of concatenated data blocks. In particular, a blockchain is understood to mean an ordered data structure in which each of the blocks (except for the first block) comprises a check value, for example a hash value, of its predecessor block and thus the validity of all its predecessor blocks may be checked and, if necessary, confirmed on the basis of each block. For examples of a blockchain see https://en.wikipedia.org/wiki/Block_chain_(database) and "Mastering Bitcoin", Chapter 7, The Blockchain, page 161 ff. The concept of the blockchain was described in a white paper on Bitcoin in 2008 under the pseudonym Satoshi Nakamoto ("Bitcoin: Peer-to-Peer Electronic Cash System" (https://bitcoin.org/bitcoin.pdf)). The blockchain described therein consists of a series of data blocks, in each of which one or more entries or transactions are grouped and provided with a checksum in the form of a hash value. Additional blocks of the blockchain are generated, for example, in a computationally intensive process also known as mining. These additionally generated blocks are then added to the blockchain and distributed to all participants or nodes of the network via a network.

Embodiments may have the advantage that the blockchain offers a high degree of security against subsequent manipulation by the saving of cryptographic checksums, i.e. hash values, of the preceding block in the following block. In a blockchain, the entries or transactions of a block are hashed together in pairs, for example by a Merkle tree, and only the last hash value of the block obtained in this way, the so-called root hash value, is noted as a checksum in a header of the block, for example. The concatenation of the blocks may then be checked using these root hash values. Each block in the blockchain contains in its header, for example, the hash of the entire previous block header. Therefore, the order of the blocks is clearly defined and a chain structure is created. The concatenation of the individual blocks with each other implemented in this way ensures that a subsequent modification of previous blocks or individual transactions is practically impossible, as the hash values of all subsequent blocks would also have to be recalculated in a short time.

The first block in the blockchain is predefined and is called the genesis block. According to embodiments, the public cryptographic keys of one or more providers, which are authorised to create program modules, are saved in the genesis block. Due to the chain structure described above, the genesis block is the block whose entries have the highest degree of security, since the entire blockchain would have to be replaced by a new blockchain to change it. Therefore, the entry of the public cryptographic key in the genesis block may constitute a trust anchor with a sufficient level of security, so that, for example, no additional PKI check is necessary to trust the authenticity of the public cryptographic key. This allows the security of the system to be maintained even in an offline mode.

In addition, safety may be additionally increased by adjusting the necessary computational intensity for the creation of additional blocks. The computational intensity required for the creation of additional blocks may be controlled via requirements on the hash value of the additional block to be created. The resulting hash value is not predictable, it is rather a randomly distributed number. However, it is possible to calculate how much time is required to find a valid additional block depending on the computing power used as a statistical average. The hash value of a block may be varied by adding and varying a nounce, for example. Due to the chain structure, data once saved in a blockchain may no longer be changed or removed without replacing large parts of the blockchain. However, such a replacement is precluded due to a sufficiently computationally intensive generation of additional blocks. Known embodiments of a blockchain, as in the case of the cryptocurrency Bitcoin for example, are based on anonymity of the partners involved in the transactions. On the other hand, the signature of the hash values entered in the transactions as described above may be used to prove their authenticity and their origin. In this way, counterfeit protection may be improved.

A requirement for a valid block may be, for example, that the hash value of the block header is less than or equal to a limit value. The calculation of the hash value may be done, for example, with the Secure Hash Algorithm (SHA) SHA 256. The resulting hash value in this case is a random number between 0 and $2^{256}-1$. The probability that a certain hash will result when the hash algorithm is applied is therefore (maximum hash value+1)$^{-1}$, that is to say, in the case of the SHA 256 algorithm it is $2^{-256}$. The probability that the resulting hash value is less than or equal to a limit or target value is therefore (target)/(max. hash value). For an exemplary maximum limit value of $(2^{16}-1)\cdot 2^{208}$ the probability is $[(2^{16}-1)\cdot 2^{208}]/2^{256} \approx 2^{-32}$. The difficulty S in obtaining a hash value which is less than or equal to a selected limit value or target may be given in dependence of a maximum limit value or max. target as follows: S=(max. target)/target. Therefore, the probability of obtaining a hash value which is less than or equal to the selected limit value is, for the example given above: $2^{-32}/S$. As an example, a computer system with a certain hash rate is considered, which, on average, every x·sec. finds a hash value which is less than or equal to the selected limit value. If the computer system is supposed to find a hash value on average every x·sec. instead of every y sec., the difficulty may be adjusted accordingly: $S_y=(x/y)\cdot S$. Corresponding adjustments of the difficulty may also be used to keep the hit rate constant when the computer system changes, e.g. changes in the computing power by increasing or decreasing the number of blockchain servers. If the difficulty is adjusted so that a hit is achieved every y·sec., the hash rate R of the computer system may be parameterised as follows: $R=(2^{32}\cdot S)/(y\cdot sec.)$.

For example, a blockchain may also be implemented in the form of a private blockchain, wherein only a selected group of participants has the authorisation to add valid blocks. A corresponding authorisation may be verified, for example, by means of a signature using a private cryptographic key. The private cryptographic key may belong to an asymmetric key pair, which also comprises a public cryptographic key with which the signature may be checked. The asymmetric key pair may also be assigned a certificate, for example, which proves the authorisation to generate a valid block of the blockchain. This certificate may also be assigned to a PKI, which proves the authenticity of the certificate. According to a further embodiment, for example, a public key may be saved in the blockchain for each participant from the selected group, for example in a genesis block. These public keys may be used to check whether block signatures and thus the corresponding blocks themselves are valid.

A consensus may also be implemented in a blockchain in another way. For example, a consensus may be reached by voting on the inclusion of proposed entries in the blockchain. For example, each participant keeps a unique list of other participants whom he trusts as a group. Each participant may propose additional entries to be included in an additional block of the blockchain. A vote will be taken on the inclusion and thus the recognition of the validity of the proposed entries. For example, each participant will only vote on those proposals that come from participants on his list. In other words, in order to decide whether a proposal for an additional entry is to be recognised as valid, i.e. whether there is a consensus among the participants on the validity of that entry, only the votes of those participants included in the list of the participant making the corresponding proposal will be taken into account. For a proposal for an entry to be accepted as valid, a certain minimum percentage of participants with voting rights must vote in favour, for example 80%. All proposed entries meeting this criterion will be included in the blockchain. Such a vote may cover several rounds. All other proposals that do not meet the above criterion are discarded or put to a new vote in the vote on the next block in the blockchain. The above-mentioned lists represent subgroups of the blockchain network which the participant leading the relevant list trusts as a group as a whole, without this requiring that he trusts each individual participant of the list. An example of such a consensus method is the Ripple Protocol Consensus Algorithm (David Schwartz et al.: "The Ripple Protocol Consensus Algorithm", Ripple Labs Inc., 2014, https://ripple.com/files/ripple_consensus_whitepaper.pdf).

For example, the blockchain may be a private or public blockchain. For example, it could be a Bitcoin, Litecoin or Ethereum blockchain.

A "program module" here refers to an independent program which is saved in a blockchain. The program module may be configured to control the creation of entries in the blockchain assigned to the program module. The program module may be saved in one block of the blockchain or distributed over several blocks of the blockchain. For example, an individual program module is assigned to each vehicle. The blockchain, for example, is a special vehicle blockchain. A program module may be a "smart contract", for example, as may be implemented for example in the open source Ethereum blockchain.

A "program" or "program instructions" is understood here without restriction to mean any type of computer program which comprises machine-readable instructions for controlling a functionality of the computer.

A "certificate" is understood here to be a digital certificate, also known as a public key certificate. By means of such certificates based on asymmetric key pairs, a so-called Public Key Infrastructure (PKI) is realised. Such a certificate is constituted by structured data that serves to assign a public key of an asymmetric cryptosystem to an identity, such as a person or a device. For example, a certificate may contain a public key and may be signed. Alternatively, certificates based on zero-knowledge cryptosystems are also possible. For example, the certificate may comply with the X.509 standard or another standard. For example, the certificate may be a CV certificate or a Card Verifiable Certificate (CVC). An implementation of such CVCs is specified in ISO/IEC 7816-8, for example.

The PKI provides a system for issuing, distributing and checking digital certificates. In an asymmetric cryptosystem, a digital certificate serves to confirm the authenticity of a public key and its permissible application and scope of validity. The digital certificate itself is protected by a digital signature, the authenticity of which may be checked with the public key of the issuer of the certificate. To verify the authenticity of the issuer's key, a digital certificate is again used. In this way, a chain of digital certificates may be created, each of which confirms the authenticity of the public key with which the previous certificate may be checked. Such a chain of certificates forms a so-called validation path or certification path. The participants of the PKI must be able to rely on the authenticity of the last certificate, the so-called root certificate, and the key certified by this certificate without the need for another certificate.

The root certificate is managed by a so-called root certification authority, whose authenticity, which is assumed to be secure, is the basis for the authenticity of all certificates of the PKI.

Digital certificates are a proven means of proving authorisation when securing electronic communication by asymmetric cryptographic methods. Certificates are structured data which document the authenticity and/or other properties/authorisations of the holder of a public key (signature verification key) and which are confirmed by an independent, credible authority (certification service provider/CSP), generally the certification authority issuing the certificate. Certificates are usually made available to a wide circle of people to enable them to check the authenticity and validity of electronic signatures.

A certificate may be assigned to an electronic signature if the private key belonging to the public key was used to generate the electronic signature to be verified. By making a certificate available to the general public in association with a public key, a CSP enables users of asymmetric cryptosystems to assign the public key to an identity, for example a person, an organisation, or an energy or computer system.

Asymmetric key pairs are used for a variety of cryptosystems and also play an important role in the signature of electronic documents. An asymmetric key pair consists of a public key, which is used to encrypt and/or decrypt data and which may be passed on to third parties, for example to a service provider, and a private key, which is used to encrypt and/or decrypt data and which usually has to be kept secret. The public key enables anyone to encrypt data for the holder of the private key, to check digital signatures of his documents or to authenticate himself. A private key enables its holder to decrypt data encrypted with the public key or to create digital signatures for electronic documents. A signature created with a private key may be verified with the corresponding public key.

Digital signatures are used for secure electronic data exchange, for example over the Internet, and make it possible to check identities and/or authorisations and the authenticity of the exchanged data. In order to guarantee this, a public key infrastructure is usually required, which confirms the validity of the used keys by means of certificates.

The creation of a digital signature, hereinafter also referred to simply as "signature", is a cryptographic method in which a further data value, which is referred to as a "signature", is calculated for any data, for example an electronic document. The signature may be, for example, an encrypted hash value of the electronic document, in particular a hash value encrypted with a private key of a cryptographic key pair assigned to a certificate. The corresponding encryption of a hash value is therefore referred to as signing of the hash value. The special feature of such a signature is that its authorship and affiliation to a particular person or authority may be checked by any third party.

A digital signature here also means a digital seal which is not assigned to a natural person but to a legal person. A digital seal is therefore not used to give a declaration of intent of an individual person but of an institution as a proof of origin. It may thus guarantee the origin and integrity of digital documents and prove that they originate from a specific legal entity.

A "memory" is understood here to include both volatile and non-volatile electronic memories or digital storage media.

A "non-volatile memory" is understood here to be an electronic memory for the permanent storage of data. A non-volatile memory may be configured as a non-alterable memory, also known as a read-only memory (ROM), or as an alterable memory, also known as non-volatile memory (NVM). In particular, it may be an EEPROM, for example a Flash EEPROM, also known as a Flash for short. A non-volatile memory is characterised by the fact that the data saved on it is retained even after the power supply is switched off.

A "volatile electronic memory" is, here, a memory for temporary storage of data and is characterised by the fact that all data is lost after the power supply is switched off. In particular, this may be a volatile direct access memory, also known as random access memory (RAM), or a volatile working memory of the processor.

A "protected memory area" is defined here as an area of an electronic memory to which access, i.e. read access or write access, is only possible via a processor of the corresponding electronic device. According to embodiments, access from the processor coupled with the memory is only possible if a condition necessary for this is fulfilled. This may be, for example, a cryptographic condition, in particular successful authentication and/or a successful authorisation check.

Here and in the following, a "processor" is understood to be a logic circuit which serves to execute program instructions. The logic circuit may be implemented on one or more discrete components, in particular on a chip. In particular, a "processor" is understood to be a microprocessor or a microprocessor system consisting of several processor cores and/or several microprocessors.

An "interface" is understood here to be an interface via which data may be received and transmitted, wherein the communications interface may be configured as contact-based or contactless. The communications interface may be an internal interface or an external interface, which is connected to an assigned device, for example by means of a cable or wirelessly.

For example, communication may take place via a network. A "network", here, means any transmission medium with a connection for communication, in particular a local connection or a local network, in particular a local area network (LAN), a private network, in particular an intranet, and a virtual private network (VPN). For example, a computer system may have a standard radio interface for connection to a WLAN. It may also be a public network, such as the Internet. Depending on the embodiment, this connection may also be established via a mobile communications network.

A "mobile communications network" is understood here and in the following to be a digital cellular mobile communications network, which may be structured according to a mobile standard such as GSM, UMTS, LTE, CDMA or another standard.

According to embodiments, the second private cryptographic key is encrypted with a third public cryptographic key of a third asymmetric key pair identified in the blockchain. The machine-readable code, using the encrypted second private cryptographic key, enables a holder of a third private cryptographic key of the third asymmetric key pair to validly sign read requests to read vehicle data contained in the vehicle certificate from the blockchain with the second private cryptographic key.

Embodiments may have the advantage that they enable a secure provision of the second private cryptographic key. For example, the third private key is a key which is at the disposal of the police, the German Federal Transport Authority and/or the registration authorities. By using the third private key, the details of the vehicle certificate may be verified by an authorised institution. The vehicle owner may read the vehicle data from the blockchain using his first private key.

According to embodiments, the second asymmetric key pair is identical to the first asymmetric key pair.

According to embodiments, the second asymmetric key pair is a key pair individual to the vehicle certificate, wherein the output instruction comprises the second public cryptographic key and wherein the second public cryptographic key, in the case of a valid signature, is saved in the blockchain. Embodiments may have the advantage that an individual key pair individual to the vehicle certificate is implemented for each vehicle certificate to check the vehicle data provided by the vehicle certificate.

According to embodiments, the output includes a printout of the vehicle certificate using a printer. Embodiments may have the advantage that the printed vehicle certificate may be used independently of the technical infrastructure.

According to embodiments, the output includes a display of the vehicle certificate on a display of a mobile portable telecommunications device. Embodiments may have the advantage of allowing the vehicle certificate to be shown on the display of the mobile portable telecommunications device in the event of an inspection.

According to embodiments, the method also comprises:
capturing the machine-readable code of the issued vehicle certificate with a reader of a checking computer system,
creating the read request to read vehicle data of the vehicle certificate from the blockchain using the captured machine-readable code, wherein the read request comprises the identification of the program module provided by the machine-readable code,
signing the read request with the second private cryptographic key provided by the machine-readable code,
sending the signed read request by the checking computer system via a second network to a blockchain server of the blockchain network,
receiving the signed read request by the blockchain server,
executing, by the blockchain server, third program instructions of the program module identified by the read request, wherein the execution of the third program instructions comprises checking the signature of the read request using the second public cryptographic key identified by the program module and, in the case of a valid signature, reading the vehicle data of the vehicle certificate requested for reading,
sending the read vehicle data by the blockchain server to the checking computer system,
receiving the read vehicle data by the checking computer system,
outputting the read vehicle data by the checking computer system.

Embodiments may have the advantage of providing an efficient and secure method for verifying information in a vehicle certificate using the blockchain.

According to embodiments, the method also comprises decrypting the second private cryptographic key provided by the machine-readable code in encrypted form with the third private key.

According to embodiments, the method comprises:
creating a first transaction instruction for the transaction of the program module from a first address assigned to the first vehicle owner, which address is assigned to the first asymmetric key pair, to a second address assigned to a second vehicle owner,
signing the first transaction instruction by the computer system of the first vehicle owner with the first private cryptographic key,
sending the signed first transaction instruction through the computer system of the first vehicle owner via a third network to a blockchain server of the blockchain network,
receiving the first transaction instruction by the blockchain server,
executing, by the blockchain server, fourth program instructions of the program module identified by the transaction instruction, wherein executing the fourth program instructions comprises checking whether the first transaction instruction is validly signed with the private cryptographic key assigned to the first address and, in the case of a valid signature, adding the first transaction instruction to an additional block for the blockchain.

Embodiments may have the advantage that, when the vehicle is transferred, the authorisation to issue vehicle certificates is transferred to the new vehicle owner.

According to embodiments, the vehicle comprises a vehicle computer system. The vehicle computer system also comprises a memory. A fourth private cryptographic key of a fourth asymmetric key pair assigned to the vehicle is saved in the memory, for example in a protected area of the memory. The vehicle computer system also comprises a mobile communications interface for communication via a mobile communications network.

The blockchain comprises, in one block, a program module with first program instructions, which is assigned to the vehicle. By executing the first program instructions, an entry which contains vehicle data of the vehicle and which is assigned to the program module is created in the blockchain. The program module further identifies a fourth public cryptographic key of the asymmetric key pair assigned to the vehicle.

The method for the tamper-proof saving of vehicle data of the vehicle comprises:
receiving vehicle data of the vehicle by the vehicle computer system,
creating a second data record for entry in the blockchain, wherein the second data record comprises the vehicle data of the vehicle and identifies the program module assigned to the vehicle,
signing the second data record by the vehicle computer system with the private fourth cryptographic key,
sending the signed second data record by the vehicle computer system via the mobile communications network to one of a plurality of blockchain servers of a blockchain network, the blockchain servers being configured to create additional blocks for the blockchain,
receiving the signed second data record by the blockchain server,
executing, by the blockchain server, the first program instructions of the program module identified by the second data record, wherein the execution of the first program instructions comprises checking the signature of the second data record using the fourth public cryptographic key identified by the program module and, in the case of a valid signature, adding a first entry containing the signed second data record and a first timestamp to an additional block for the blockchain.

The value of a used vehicle and thus also the price achievable on the used car market depends largely on the condition of the vehicle to be sold. However, determining the actual condition of a vehicle may be difficult. In particular, the wear and tear of individual components and the resulting probability of breakdowns and necessary repairs may sometimes be difficult to estimate from the external appearance of the respective components. A reliable assessment would be possible, if necessary, on the basis of detailed investigations, but these generally prove to be uneconomical due to the high effort and resultant costs involved.

For a simple and efficient assessment, auxiliary variables are therefore used to estimate the condition of a corresponding vehicle. A widely used indirect auxiliary variable for assessing the condition of a vehicle is its mileage. Consequently, the mileage has a direct influence on the resale value of the vehicle.

In order to make a higher profit on the used car market, it therefore happens that mileage figures on vehicles are manipulated and a lower mileage is feigned. In principle, conclusions may be drawn about the approximate mileage from the condition of a vehicle, but it is precisely this condition that needs to be determined and evaluated. The older the vehicle and the more significant the discrepancies between the manipulated mileage and the actual mileage, the easier it may be to detect obvious discrepancies by the external appearance of the vehicle. However, the younger the vehicle and the less serious the discrepancies to the actual mileage are, the more difficult it is to detect the manipulation.

Embodiments may have the advantage that a tamper-proof saving of vehicle data of a vehicle may be implemented in a simple way, with a high level of protection against forgery. The resulting tamper-proof vehicle history may serve as proof that no irregularities have occurred. Consequently, a higher resale value may be achieved for the vehicle. The logged vehicle history may be used not only to prove that no irregularities have occurred in the recording of vehicle data, such as the mileage. In addition, the vehicle history may also be used, for example, to determine whether special events such as accidents or malfunctions have occurred.

The vehicle data saved in a temper-proof manner may also be used for up-to-date fault diagnosis. If a problem occurs, it may be checked whether this has already occurred in the past or whether the saved vehicle data provide information about the possible cause of the observed problem.

In this context, vehicle data comprises both vehicle condition data as well as identifiers and legal classifications.

According to embodiments, the vehicle includes at least one sensor to capture vehicle data from the vehicle. The vehicle data of the vehicle are received by the vehicle computer system from the at least one sensor. According to embodiments, the vehicle comprises a plurality of sensors for capturing vehicle data from the vehicle. Embodiments may have the advantage that the vehicle's own sensors may be used to capture the condition of the vehicle. The condition of the vehicle may be described, for example, by information regarding characteristic variables of the current performance capability of the vehicle, vehicle mileage, error messages, results of predefined test protocols and/or identifiers of vehicle components.

Characteristic variables of the current performance capability may be, for example, engine speed, vehicle speed, fuel consumption, exhaust emission values, gear. Error messages may indicate malfunctions identified by the vehicle computer system using an error detection protocol, i.e. deviations of measured values captured by sensors from predefined values or value ranges. A predefined test protocol may interrogate individual components and, based on the responses received or not received, create a list that identifies components that do not function or do not function as expected.

For example, the vehicle computer system requests identifiers of components of the vehicle electronics, such as series, type and/or manufacturer identifiers, which are saved in the components of the vehicle electronics. According to embodiments, an identifier of the vehicle may be calculated from the identifiers of the individual components. This identifier is a characteristic of this vehicle, which defines the specific composition of its components and thus the condition of the vehicle. In a sense, it is a "fingerprint" of the vehicle.

According to embodiments, the identifiers of the components of the vehicle electronics are saved in a memory of the particular component, for example in a protected memory area of the memory, and are transmitted to the vehicle computer system in a cryptographically secured manner.

A "sensor" is understood here to be an element for capturing measurement data. Measurement data are data which qualitatively or quantitatively represent physical or chemical properties of a measurement object, such as heat quantity, temperature, humidity, pressure, sound field sizes, brightness, acceleration, pH value, ionic strength, electrochemical potential, and/or its material composition. Measurement data are captured by means of physical or chemical effects and are converted into an electronically processable electrical signal. Furthermore, measurement data may represent states and/or changes in state of electronic devices due to external influences and/or as a result of use by a user.

Sensors used to capture vehicle data in a vehicle may comprise, for example: crankshaft sensor, camshaft sensor, air mass sensor, air temperature sensor, cooling water temperature sensor, throttle valve sensor, knock sensor, gear sensor, distance sensor, gear sensor, level sensor, brake wear sensor, axle load sensor, steering angle sensor. These sensors detect and monitor the vehicle's driving behaviour. Malfunctions may be detected and identified from deviations from setpoint values and/or the occurrence of certain patterns. In some cases, specific causes of faults, such as failed components of the vehicle, may also be identified. In addition, sensors may also request the identification of electronic components installed in the vehicle to check their identity.

According to embodiments, the vehicle data comprise the mileage of the vehicle. Embodiments may have the advantage that the mileage is an easy-to-measure characteristic variable for recording the condition of a vehicle. In particular, when a used vehicle is sold, the mileage is a decisive factor for evaluating the vehicle and determining a purchase price. In particular, the recording of the vehicle's mileage with timestamps in the blockchain provides a forgery-proof summary of the development of the mileage over time. With a suitable choice of the logging intervals it may thus be ensured that no significant manipulations have occurred. If the mileage is manipulated in such a way that it is less than the last saved mileage, the manipulation becomes easily recognisable when checking the blockchain entries. Furthermore, the history of the vehicle's use may be traced by the development of the mileage. If it was used regularly or evenly, or was used irregularly, i.e. there were longer rest periods and periods of very intensive use, which may indicate an increased load on the vehicle.

For example, the logging of the mileage also allows the implementation of a tamper-proof logbook in a simpler way. To this end, the mileage is recorded at least at the end of each journey, for example when the driver switches off the ignition. In addition, the mileage at the beginning of the journey, e.g. when the ignition is switched on, may also be logged. Furthermore, the starting point and/or destination of the journey may also be recorded automatically. Information about the current location is provided, for example, by a navigation system of the vehicle. Lastly, according to embodiments, the vehicle asks the driver to enter his name and the purpose of the journey. The entry may be made via a corresponding input interface of the vehicle.

For example, speech recognition is used to record what the driver says orally in response to the request. According to embodiments, the user authenticates himself to the vehicle with an ID token. The information summarised as an entry in the logbook is, for example, transmitted in fully or at least partially encrypted form to the blockchain and entered there. The encryption is carried out, for example, with a private or public cryptographic key of an asymmetric key pair which is assigned to the logbook. Thus, only those who have the second key of the asymmetric key pair, i.e. the public or private cryptographic key, may read the contents of the logbook entries in decrypted form and in plain text. According to embodiments, timestamps and mileages are saved in unencrypted form, while personal data such as place of departure and/or destination, driver's name or purpose of the journey are encrypted.

According to embodiments, the vehicle data comprise a fault message from the vehicle. Embodiments may have the advantage that the blockchain may be used to trace which faults occurred when. This means that the blockchain may be used to read off, without much effort, whether the vehicle was susceptible to faults in the past and which faults have occurred, and, when new faults occur, possible connections with problems that have already occurred in the past may be recognised, and thus the causes of faults may be better identified.

According to embodiments, the vehicle data comprise a software ID of a software update of the vehicle computer system. Embodiments may have the advantage that it is possible to trace when which software or software version was installed on the vehicle computer system. Since in modern vehicles the vehicle software has a farreaching influence on the control of the technical components, such as the engine, an identification of the software may provide important information regarding the condition and functional behaviour of the vehicle.

According to embodiments, the vehicle data comprise an identifier assigned to a number of electronic components of the vehicle. Embodiments may have the advantage that the identifier identifies a combination of electronic components. This identifier may be calculated, for example, from series, type and/or manufacturer identifiers saved in the vehicle's electronic components. This identifier may therefore be, for example, an identifier assigned to the individual vehicle, which represents a characteristic of the vehicle defined by the specific combination of electronic components. In other words, the combination of electronic components may represent a kind of "fingerprint" of the vehicle.

In particular, the identifier may be used to detect changes in the composition of the vehicle's electronic components. For example, each of the electronic components has its own identifier. This may be an individual identifier, for example. If a component is removed and/or replaced, the combination of the electronic components changes, and with it the assigned identifier. Therefore, the electronic components themselves may be understood as sensors for detecting a composition of electronic components in the vehicle. According to embodiments, the vehicle data comprise a plurality of identifiers of individual electronic components. According to embodiments, if an identifier assigned to a plurality of electronic components changes, the vehicle data comprise identifiers of individual electronic components of the plurality of electronic components that have changed.

According to embodiments, the vehicle computer system receives the vehicle data from a computer system in a workshop. The vehicle data received by the workshop's computer system is signed with a fifth private cryptographic key of a fifth asymmetric key pair assigned to the workshop. The method further comprises: checking the signature of the data received by the workshop using a fifth public cryptographic key of the fifth asymmetric key pair assigned to the workshop and, in the case of a valid signature, using the data received by the workshop to create the second data record. Embodiments may have the advantage that additional data regarding the condition of the vehicle may be provided by the workshop and entered in the blockchain. These additional vehicle data may, for example, concern repair and maintenance work carried out by the workshop. For example, the reason for a repair, i.e. the fault rectified, and the repair measures carried out, e.g. replaced vehicle parts, are indicated. According to embodiments, the data comprises identifiers of removed and newly installed vehicle parts. In addition, the data provided by the workshop may describe states of the vehicle which are not detected by the vehicle's own sensors, such as damage to a windscreen by stone chips or vehicle body damage.

In addition, data regarding maintenance work carried out may be saved in this way according to a predefined service plan, also known as a maintenance plan. The service plan is specified by the vehicle manufacturer and may depend on the vehicle model, the interval or the intensity of use. In particular, the maintenance may be designed for different test points based on suspected or recognised weaknesses. Among other things, wear and tear and the probability of technical defects are taken into account. In particular, the maintenance may include a software update.

The service plan is primarily intended to maintain the functionality and operational safety of the vehicle. In addition, compliance with the service intervals by authorised workshops may be a basic prerequisite for the manufacturer's warranty. On the basis of the blockchain, it is therefore possible to see whether the service plan has been adhered to and/or which measures have been carried out by the workshop during the course of maintenance.

According to embodiments, the second data record additionally comprises a workshop ID as the origin of the vehicle data. Embodiments may have the advantage that it is possible to clearly identify by whom which additional data was made available. For example, it may be seen whether repair and/or maintenance work was carried out by an authorised workshop.

According to embodiments, the second data record comprises, as workshop ID, the signature of the vehicle data received from the workshop's computer system. Embodiments may have the advantage that the signature binds the identity of the workshop to the second data record and the authenticity of this may be verified by means of a public cryptographic key of the workshop, which is assigned to a secret cryptographic key used to create the signature.

According to embodiments, the vehicle data received by the workshop's computer system comprise data regarding maintenance and/or repair work carried out.

According to embodiments, the vehicle data received by the workshop's computer system comprise at least one vehicle part ID of a replaced vehicle part. Embodiments may have the advantage of making it possible to trace which vehicle part a vehicle actually contains. In the case of electronic components, for example, this information may be matched with the IDs of the components that the vehicle computer system captures and saves in the blockchain. This makes it possible to detect effective discrepancies and possible manipulations.

According to embodiments, the blockchain comprises an entry with the vehicle ID and the public cryptographic key of the asymmetric key pair assigned to the vehicle. Embodiments may have the advantage of providing easy access to the public cryptographic key of the vehicle and efficient verification of the signature of the data records of the vehicle. Therefore, the blockchain alone may be used to verify the authenticity of the data records of the vehicle.

According to embodiments, the second data record is created after a predefined time interval has elapsed. Embodiments may have the advantage that data is inserted in the blockchain at regular intervals.

According to embodiments, the second data record is created following receipt of the vehicle data, if the vehicle data meets a predefined criterion. Embodiments may have the advantage that the creation of a data record and its insertion in the blockchain may be carried out, for example, depending on use or event. A data record is created, for example, in response to a specific error message and includes this error message, if necessary together with other sensor data from which the vehicle status may be derived when the error message occurs.

According to embodiments, the criterion is that a predefined mileage is reached. Embodiments may have the advantage that the data saved in the blockchain shows at which time and in which intervals certain mileages were reached. This has the advantage that the number of blockchain entries is also limited accordingly in the case of light use of a vehicle, which means that the memory size required to save the blockchain may be limited.

According to embodiments, the program module identifies the fifth public cryptographic key of the fifth asymmetric key pair assigned to the workshop. In addition, the fifth private cryptographic key of the fifth asymmetric key pair assigned to the workshop is saved in a memory of the workshop's computer system, for example in a protected area of the memory. The workshop's computer system also comprises a communications interface for communication via a third communications network. The method also comprises:

creating a third data record for entry into the blockchain by the workshop's computer system, wherein the third data record comprises vehicle data of the vehicle and identifies the program module assigned to the vehicle, signing of the third data record by the workshop's computer system with the fifth private cryptographic key of the workshop, sending the signed third data record by the workshop's computer system via the third communications network to a blockchain server of the blockchain network, receiving the signed third data record by the blockchain server, executing, by the blockchain server, the first program instructions of the program module identified by the third data record, wherein the execution of the first program instructions comprises checking the signature of the third data record using the fifth public cryptographic key of the asymmetric key pair assigned to the workshop identified by the program module and, in the case of a valid signature, adding a second entry containing the signed third data record and a second timestamp to an additional block for the blockchain.

Embodiments may have the advantage that the workshop may also independently make entries containing vehicle data of the vehicle in the blockchain. This means that another independent data source is available in addition to the vehicle. By comparing the entries made by the vehicle and the workshop in the blockchain, discrepancies and possible manipulations may be detected.

According to embodiments, the program module identifies a sixth public cryptographic key of a sixth asymmetric key pair assigned to a manufacturer of the vehicle. A sixth private cryptographic key of the sixth asymmetric key pair assigned to the vehicle manufacturer is saved in a memory of a vehicle manufacturer's computer system, for example in a protected memory area of the memory. The vehicle manufacturer's computer system shall comprise a communications interface for communication via a fourth communications network. The method also comprises:

creating a fourth data record for entry in the blockchain by the vehicle manufacturer's computer system, wherein the fourth data record comprises vehicle data of the vehicle and identifies the program module assigned to the vehicle, signing of the fourth data record by the vehicle manufacturer's computer system with the sixth private cryptographic key of the vehicle manufacturer, sending the signed fourth data record by the vehicle manufacturer's computer system via the fourth communications network to a blockchain server of the blockchain network, receiving the signed fourth record by the blockchain server, executing, by the blockchain server, the first program instructions of the program module identified by the fourth data record, wherein the execution of the first program instructions comprises checking the signature of the fourth data record using the sixth public cryptographic key of the asymmetric key pair assigned to the vehicle manufacturer identified by the program module and, in the case of a valid signature, adding a third entry containing the signed fourth data record and a third timestamp to an additional block for the blockchain.

Embodiments may have the advantage that the manufacturer of the vehicle may independently make entries about the vehicle in the blockchain. Since entries in the blockchain are unable to be removed due to the chain structure, where each block is based on the preceding blocks, the vehicle manufacturer is able to provide basic information about the vehicle that may be accessed at any time. In particular, the vehicle manufacturer will be able to initialise the vehicle or personalise the program module. Initial vehicle data of the vehicle may be entered in the blockchain. This means that a further independent data source is available in addition to the vehicle.

According to embodiments, the fourth data record comprises technical vehicle specifications. Embodiments may have the advantage that such a data record provides information regarding the basic properties of the vehicle. In particular, such an entry is not able to be subsequently manipulated. For example, the data record may comprise a chassis number, an engine number, information regarding vehicle properties and/or a hash of the registration certificate, i.e. registration certificate part I and/or II, of the vehicle. Furthermore, such an entry may also comprise an initial mileage of the vehicle. The information regarding vehicle properties may include, for example, the information contained in the registration certificate part I and/or II, such as date of first registration, vehicle category, type of bodywork, vehicle identification number, make, type/variant/version, trade names, manufacturer's abbreviation, designation of the vehicle category and bodywork, pollutant class relevant for EC type-approval, designation of the national emission class, fuel type or energy source, engine capacity, exemptions, number of axles, number of driving axles, rated power, rated engine speed, maximum vehicle speed, length, width, height, unladen mass, tank capacity, drawbar load, power-to-weight ratio, $CO_2$ emissions, technically permissible maximum laden mass, axle loads on each axle, stationary noise level, driving noise level, technically permissible maximum towable mass (braked/unbraked), number of seats, number of standing passengers, tyres, colour of the vehicle, EC type approval number and/or general operating license number.

According to embodiments, the method also comprises:

creating a fifth data record for entry into the blockchain by the computer system of the first vehicle owner, wherein the fifth data record comprises vehicle data of the vehicle and identifies the program module assigned to the vehicle, signing the fifth data record by the computer system of the first vehicle owner with the first private cryptographic key of the first vehicle owner, sending the signed fifth data record by the computer system of the first vehicle owner via the first communications network to a blockchain server of the blockchain network, receiving the signed fifth record by the blockchain server, executing, by the blockchain server, the first program instructions of the program module identified by the fifth data record, wherein the execution of the first program instructions comprises checking the signature of the fifth data record using the first public cryptographic key of the first asymmetric key pair assigned to the first vehicle owner identified by the program module and, in the case of a valid signature, adding a fourth entry containing the signed fifth data record and a fourth timestamp to an additional block for the blockchain.

Embodiments may have the advantage that the owner of the vehicle may also independently make entries containing vehicle data of the vehicle in the blockchain. This means that a further independent data source is available in addition to the vehicle. By comparing the entries made by the vehicle and the owner in the blockchain, discrepancies and possible manipulations may be detected.

According to embodiments, the fifth data record comprises an indicator of a theft and/or immobilisation of the vehicle. Embodiments may have the advantage that even if the vehicle is lost, abandoned and/or disabled, these final vehicle conditions may be entered in the blockchain. Such an entry makes it possible, for example, when a vehicle is purchased, to check without much effort whether it has been recorded as stolen. According to embodiments, an indicator of a theft and/or immobilisation of the vehicle may also be contained in a data record which is generated by the vehicle itself or by the vehicle manufacturer and entered in the blockchain. For example, an indicator of vehicle immobilisation may also be contained in a data record generated by a workshop and included in the blockchain.

According to embodiments, in a memory of a computer system of a provider of the program module, for example in a protected memory area of the memory, there is saved a seventh private cryptographic key of a third address assigned to the provider of the program module. The provider's computer system comprises a communications interface for communication via a fifth communications network. In addition, a private cryptographic key of a fourth address assigned to the vehicle manufacturer is saved in the memory of the vehicle manufacturer's computer system, for example in the protected memory area of the memory. The method also comprises:

- creating, by the provider's computer system, a second transaction instruction for transaction of the program module from the third address assigned to the provider of the program module to the fourth address assigned to the vehicle manufacturer,
- signing the second transaction instruction by the provider's computer system with the private cryptographic key of the third address,
- sending the signed second transaction instruction by the provider's computer system via the fifth network to a blockchain server of the blockchain network,
- receiving the signed second transaction instruction by the blockchain server,
- checking, by the blockchain server, whether the second transaction instruction is validly signed with the private cryptographic key assigned to the third address,
- in the case of a valid signature, adding the second transaction instruction to an additional block for the blockchain.

Embodiments may have the advantage that the program module is created by a provider and inserted in the blockchain. For example, the program module may be configured to execute the previously described embodiments of the method. In particular, the program module may be configured to generate additional entries in the blockchain and to find old blockchain entries, for example those generated by the program module.

The program module generated in this way may be configured in such a way that a certain functionality may only be executed if a signature with a private cryptographic key is provided for its confirmation, which key is assigned to an authority that is authorised to execute this functionality. For example, such a private cryptographic key may be a private cryptographic key of a program module address saved in the blockchain. In other words, for example, this may be a private cryptographic key of an address defined by a public cryptographic key assigned to the private cryptographic key and for which the blockchain comprises an entry indicating that the program module has been transferred to or assigned to that public cryptographic key. Only those who are in possession of the corresponding private cryptographic key may perform certain functions and at the same time have control over the program module. Such a private cryptographic key may serve as a master key.

Furthermore, the blockchain may comprise entries assigned to the program module which comprise a public cryptographic key and assign the authorisation to execute one or more functionalities of the program module to an asymmetric key pair assigned to the public cryptographic key. For example, the entries may be signed using a private cryptographic key assigned to the program module provider. According to embodiments, the entries may be signed with a private cryptographic key of an asymmetric key pair to which the authorisation to do so has been assigned. Thus, authorisation chains may be implemented which may be traced back to a signature of the provider of the program module.

The right of disposal of the program module may be transferred from one private cryptographic key to another by transferring the program module from one address or first public cryptographic key, to which a first private cryptographic key is assigned, to another address or second public cryptographic key, to which a second private cryptographic key is assigned. Such a transaction is defined by a corresponding entry in the blockchain.

Through the transaction of the program module from an address assigned to the provider of the program module to an address assigned to the vehicle manufacturer, the right of disposal of the program module is transferred from the provider of the program module to the vehicle manufacturer. For example, the vehicle manufacturer is authorised by the transaction to personalise the program module for a specific vehicle using the private cryptographic key assigned to the second address, i.e. to assign the program module to a specific vehicle. "Personalisation" is understood here as an assignment to an individual vehicle. Personalisation may be implemented by using attributes which identify the corresponding vehicle. For example, these attributes, either individually or in combination with each other, uniquely identify the vehicle.

The owner of the master key is, for example, able to activate functions of the program module for other participants. For example, the function of entering data records containing vehicle data of the vehicle in a valid way may be enabled using the master key, wherein an entry signed with the master key is generated in the blockchain, which comprises a public cryptographic key. Such an entry identifies the corresponding public cryptographic key. The blockchain may be used at any time to check that the master key used to sign the corresponding entry is assigned to an address or a public cryptographic key which corresponds to the program module at the time of the entry being included in the blockchain.

The generation and insertion of the program module into the blockchain comprises, for example:

- creating the program module by the provider's computer system,
- creating, by the provider's computer system, an entry request for entry of the program module with an initial address assigned to the provider, wherein the entry request comprises the program module and a private cryptographic key is assigned to the initial address,
- signing the entry request by the provider's computer system with the private cryptographic key of the initial address,
- sending the signed entry request by the provider's computer system via the fourth network to a blockchain server of the blockchain network,
- receiving the signed entry request from the blockchain server,
- checking, by the blockchain server, whether the entry request is validly signed with the private cryptographic key assigned to the initial address,
- in the case of a valid signature, adding the program module to an additional block for the blockchain.

According to embodiments, a certificate assigned to the asymmetric key pair of the initial address is also entered in the blockchain. For example, the certificate is entered in the blockchain together with the program module. The certificate may be a certificate of a PKI, for example a hierarchical PKI with a central root certification authority. Embodiments may have the advantage that the certificate creates a trust anchor which ensures that the program module is an authentic entry which may be traced back to an officially recognised source authority in the form of the provider of the program module. The trust in all subsequent entries in the blockchain for this vehicle may be derived from this trust anchor. For example, the cryptographic keys used for the authentication of the subsequent entries must first be confirmed by the certified private cryptographic key.

According to embodiments, the program module may be entered distributed over a number of blocks of the blockchain.

According to embodiments, the right of disposal of the program module remains with the vehicle manufacturer.

According to embodiments, a private cryptographic key of a first address assigned to the first vehicle owner is saved in the memory of the vehicle owner's computer system, for example in the protected memory area of the memory, and the method comprises:

creating, by the vehicle manufacturer's computer system, a third transaction instruction for transaction of the program module from the second address assigned to the vehicle manufacturer to the first address assigned to the vehicle owner, signing the third transaction instruction by the vehicle manufacturer's computer system with the private cryptographic key of the fourth address, sending the signed third transaction instruction through the vehicle manufacturer's computer system via the fourth network to a blockchain server on the blockchain network, receiving the third transaction instruction by the blockchain server, checking, by the blockchain server, whether the second transaction instruction is validly signed with the private cryptographic key assigned to the fourth address, in the case of a valid signature, adding the second transaction instruction to an additional block for the blockchain.

Embodiments may have the advantage that, through the transaction of the program module from the address assigned to the vehicle manufacturer to the address assigned to the vehicle owner, the right of disposal of the program module is transferred to the vehicle owner. In this way, the right of disposal of the program module is linked to the ownership of the vehicle. For example, if the vehicle is sold, another transaction may be made to the new owner of the vehicle.

According to embodiments, a private cryptographic key of a first address assigned to the first vehicle owner is saved in a memory of a computer system of a new vehicle owner, for example in a protected memory area of the memory, and the method further comprises:

creating a third transaction instruction for transaction of the program module from the fourth address assigned to the previous vehicle owner to the first address assigned to the first vehicle owner by the vehicle manufacturer's computer system, signing the third transaction instruction by the vehicle manufacturer's computer system with the private cryptographic key of the fourth address, sending the signed third transaction instruction through the vehicle manufacturer's computer system via the fourth network to a blockchain server of the blockchain network, receiving the third transaction instruction by the blockchain server, checking by the blockchain server whether the third transaction instruction is signed with the private cryptographic key assigned to the fourth address, in the case of a valid signature, adding the third transaction instruction to an additional block for the blockchain.

According to embodiments, the program module comprises fourth program instructions. By executing the fourth program instructions, an entry assigned to the program module is generated in the blockchain and comprises a clearance for the assignment of the program module to the vehicle. The program module further comprises fifth program instructions, the execution of which generates a blockchain entry assigned to the program module, which entry assigns the program module to the vehicle. The method comprises:

by a blockchain server of the blockchain network, receiving a first request for enabling an authorisation to assign the program module to the vehicle by the vehicle manufacturer, wherein the first request comprises the public cryptographic key of the vehicle manufacturer, and the program module to be assigned to the vehicle is identified and validly signed with the private cryptographic key of the provider of the program module, executing, by the blockchain server, the fourth program instructions of the program module identified by the first request, wherein the execution of the fourth program instructions comprises checking the signature of the first request using the public cryptographic key of the asymmetric key pair, assigned to the provider, identified by the program module and, in the case of a valid signature, adding a fifth entry containing the public cryptographic key of the vehicle manufacturer, an assignment clearance, and a fifth timestamp to the additional block for the blockchain, receiving a second request of the vehicle manufacturer to assign the program module to the vehicle by the blockchain server, wherein the second request identifies the program module to be assigned to the vehicle and is validly signed with the private cryptographic key of the vehicle manufacturer, executing the fifth program instructions of the program module by the blockchain server, wherein the execution of the fifth program instructions comprises checking the signature of the second request using the public cryptographic key of the asymmetric key pair assigned to the vehicle manufacturer saved in the fifth entry and, in the case of a valid signature, adding a sixth entry containing the public cryptographic key of the vehicle, an assignment of the program module to the vehicle, and a sixth timestamp to an additional block for the blockchain.

Embodiments may have the advantage that the program module is created by the provider and inserted in the blockchain. The program module created in this way is not yet personalised, i.e. it is not yet assigned to a specific vehicle. This non-personalised program module is personalised by the vehicle manufacturer, i.e. it is assigned to a vehicle by storing an identifier of the vehicle in a block of the blockchain assigned to the program module. The identifier may be, for example, a vehicle identification number or a public cryptographic key assigned to the vehicle.

For example, if the vehicle manufacturer produces or has produced a new vehicle, he asks the provider for an additional program module for the new vehicle. In addition, the vehicle manufacturer sends the provider his public cryptographic key. This public cryptographic key is activated by the provider so that the vehicle manufacturer may personalise the program module for the new vehicle.

According to embodiments, the program module comprises sixth program instructions. By executing the sixth program instructions, an entry assigned to the program module which comprises a clearance for assigning the program module to the vehicle is generated in the blockchain. The assignment comprises:

by a blockchain server of the blockchain network, receiving a third request for enabling an authorisation to assign the program module to the vehicle by the vehicle manufacturer, wherein the third request comprises a password and the public cryptographic key of the vehicle manufacturer and identifies the program module to be assigned to the vehicle, executing, by the blockchain server, the sixth program instructions of the program module identified by the third request, wherein the execution of the sixth program instructions involves checking the password using an encrypted reference value saved in the blockchain and, in the case of a valid reference value, adding a seventh entry containing the public cryptographic key of the vehicle manufacturer, an assignment clearance, and a seventh timestamp to an additional block for the blockchain, receiving, by the blockchain server, a second request from the vehicle manufacturer to assign the program module to the vehicle, wherein the second request identifies the program module to be assigned to the vehicle and is validly signed with the private cryptographic key of the vehicle manufacturer, executing the fifth program instructions of the program module by the blockchain server, wherein the execution of the fifth program instructions comprises checking the signature of the second request using the public cryptographic key of the asymmetric key pair assigned to the vehicle manufacturer saved in the fifth entry and, in the case of a valid signature, adding a sixth entry containing the public cryptographic key of the vehicle, an assignment of the program module to the vehicle, and a sixth timestamp to an additional block for the blockchain.

Embodiments may have the advantage that, on request, the vehicle manufacturer is sent a password by the provider of the program module, with which password the vehicle manufacturer may unlock the authorisation for assigning the program module to a vehicle, i.e. a registering vehicle.

For example, the password may be a "one-time password" or "OTP". An OTP is understood here to be a one-time password or a one-time code word that is only to be valid for a single use. For example, such a one-time password may be a TAN.

According to embodiments, the blockchain is additionally configured to execute transfers of amounts of a cryptocurrency. Embodiments may have the advantage that invoices, for example for the purchase of the vehicle, repairs, spare parts, maintenance, etc., may be assigned to the vehicle or its owner and may be paid by them using the blockchain.

Embodiments further comprise one which comprises a computer system of a first vehicle owner and a blockchain network with at least one blockchain server. The computer system of the first vehicle owner comprises a memory and a communications interface for communication via the first network. The at least one blockchain server is configured to execute a program module saved in the blockchain and to provide a vehicle certificate. The system is configured to execute a method according to one of the embodiments of the method described above.

According to embodiments, the system further comprises a checking computer system, wherein the checking computer system comprises a reader and a communications interface for communication via a second network. The system is configured to carry out a method according to one of the previously described embodiments.

According to embodiments, the system also comprises a vehicle with a vehicle computer system. The vehicle computer system comprises a memory. The vehicle computer system further comprises a mobile communications interface for communication via a mobile communications network. The system is configured to execute a method according to one of the previously described embodiments of the method.

According to embodiments, the system also comprises a workshop's computer system. The workshop's computer system comprises a memory and a communications interface for communication via a first communications network. The system is configured to carry out a method according to one of the previously described embodiments.

According to embodiments, the system also comprises a vehicle manufacturer's computer system. The vehicle manufacturer's computer system comprises a memory and a communications interface for communication via a second communications network. The system is configured to carry out a method according to one of the previously described embodiments.

According to embodiments, the system also comprises a vehicle owner's computer system. The vehicle owner's computer system comprises a memory and a communications interface for communication via a third communications network. The system is configured to carry out a method according to one of the previously described embodiments.

According to embodiments, the system also comprises a computer system of a provider of the program module. The computer system of a provider of the program module comprises a memory and a communications interface for communication via a fourth communications network. The system is configured to carry out a method according to one of the embodiments described above.

The use of ordinal numbers such as first, second, third, etc. serves here, unless the specific context clearly indicates otherwise, solely to distinguish different elements from one another and is not intended to imply a specific order.

According to embodiments, the above-mentioned communications networks may be the same or different communications networks in all or some of the embodiments.

According to embodiments, all or some of the above-mentioned entries are added to the same additional block or different additional blocks for the blockchain.

Figure 2A:
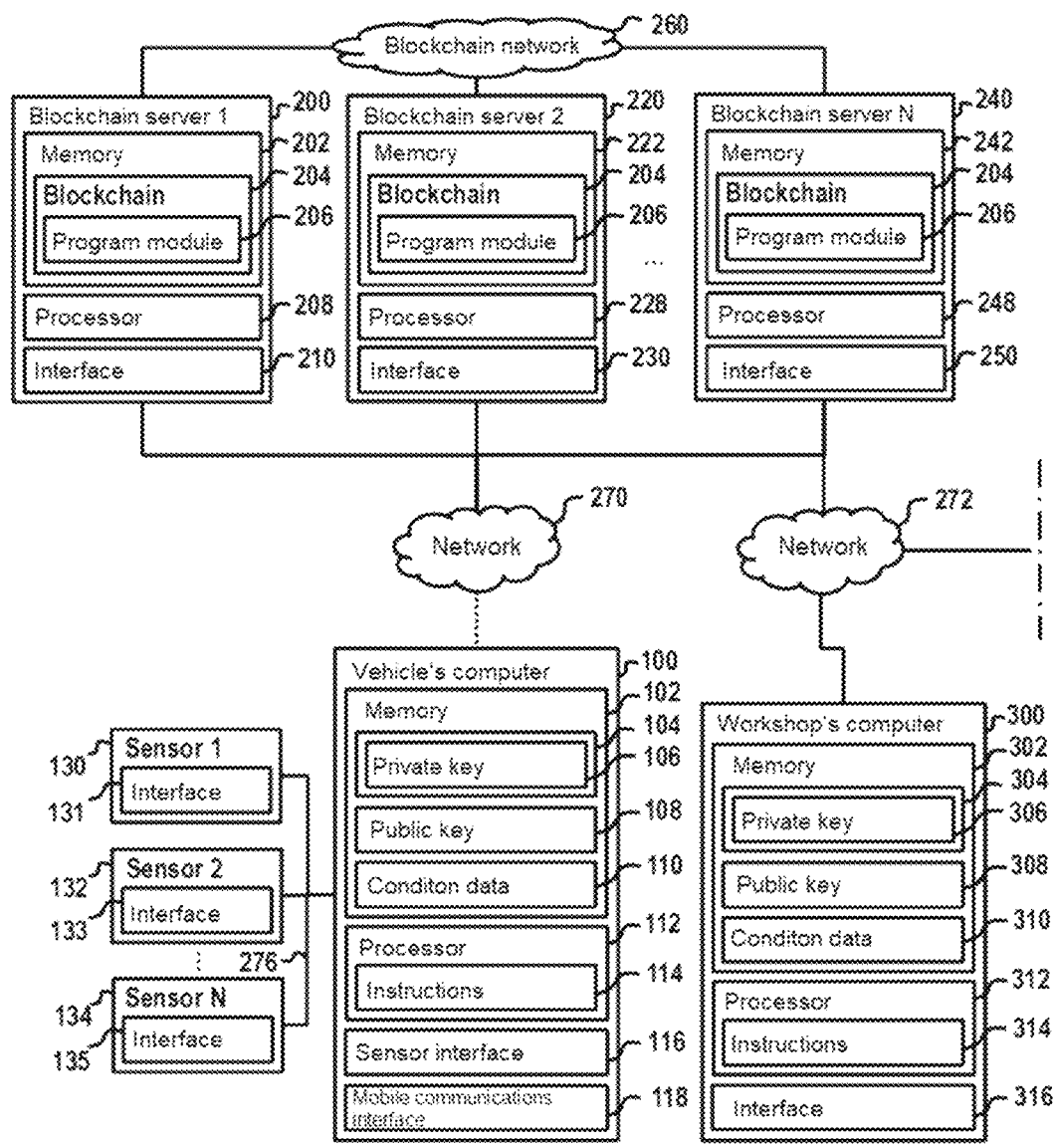
Figure 2B:
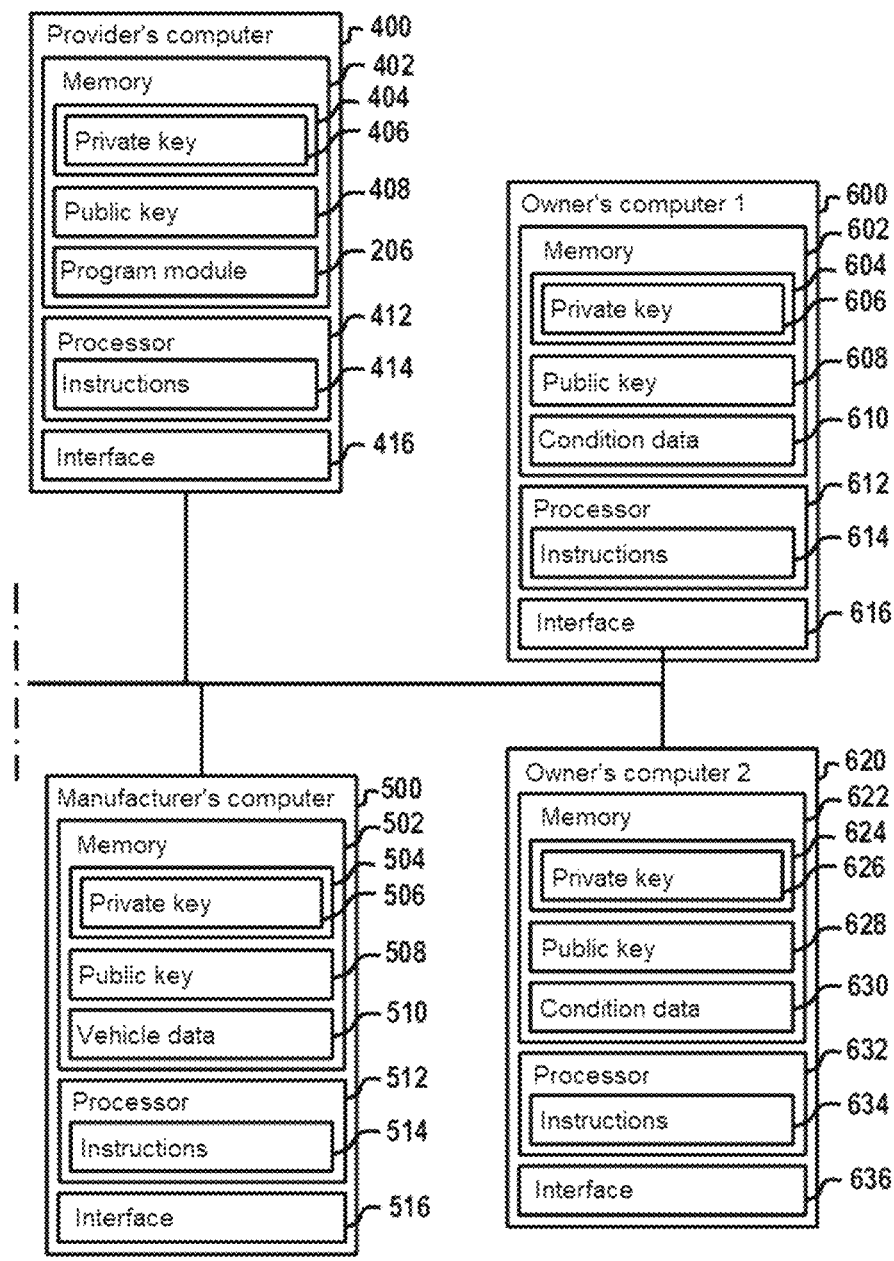
Figure 3:
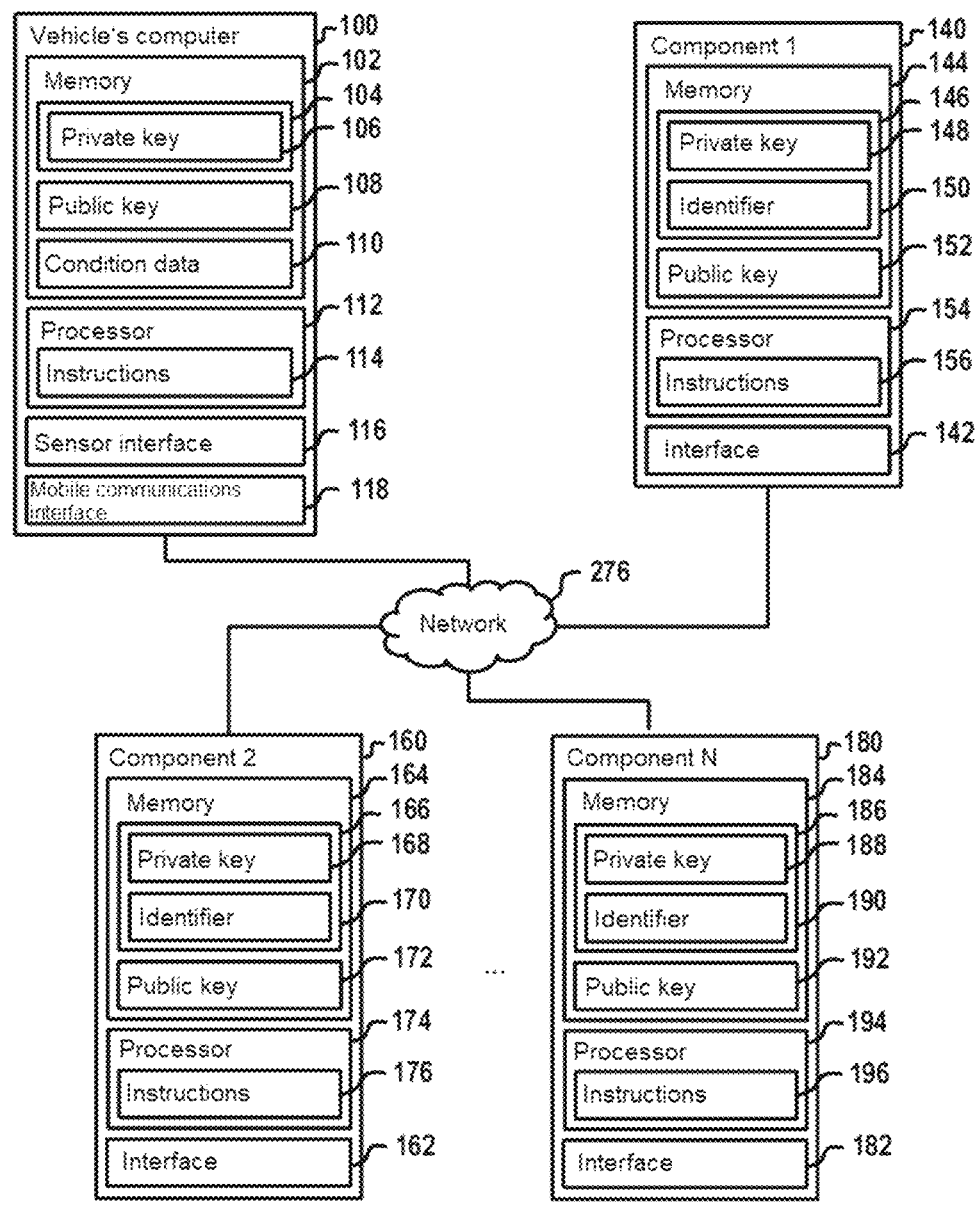
Figure 4:
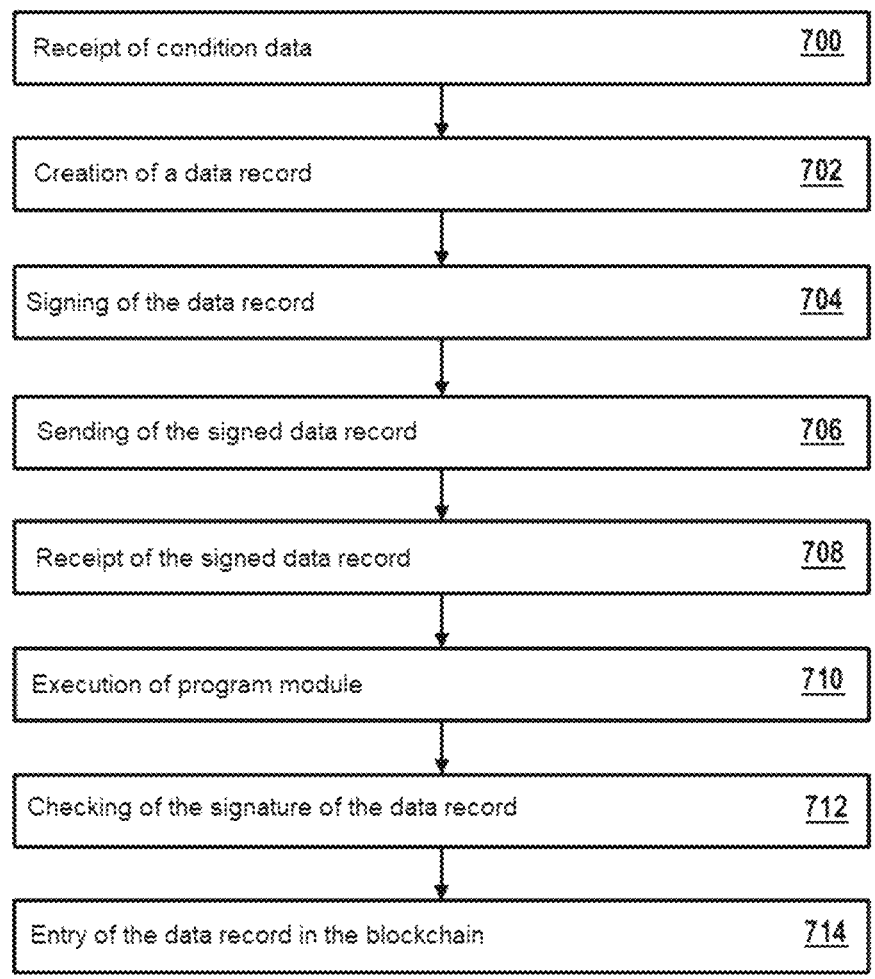
Figure 5:
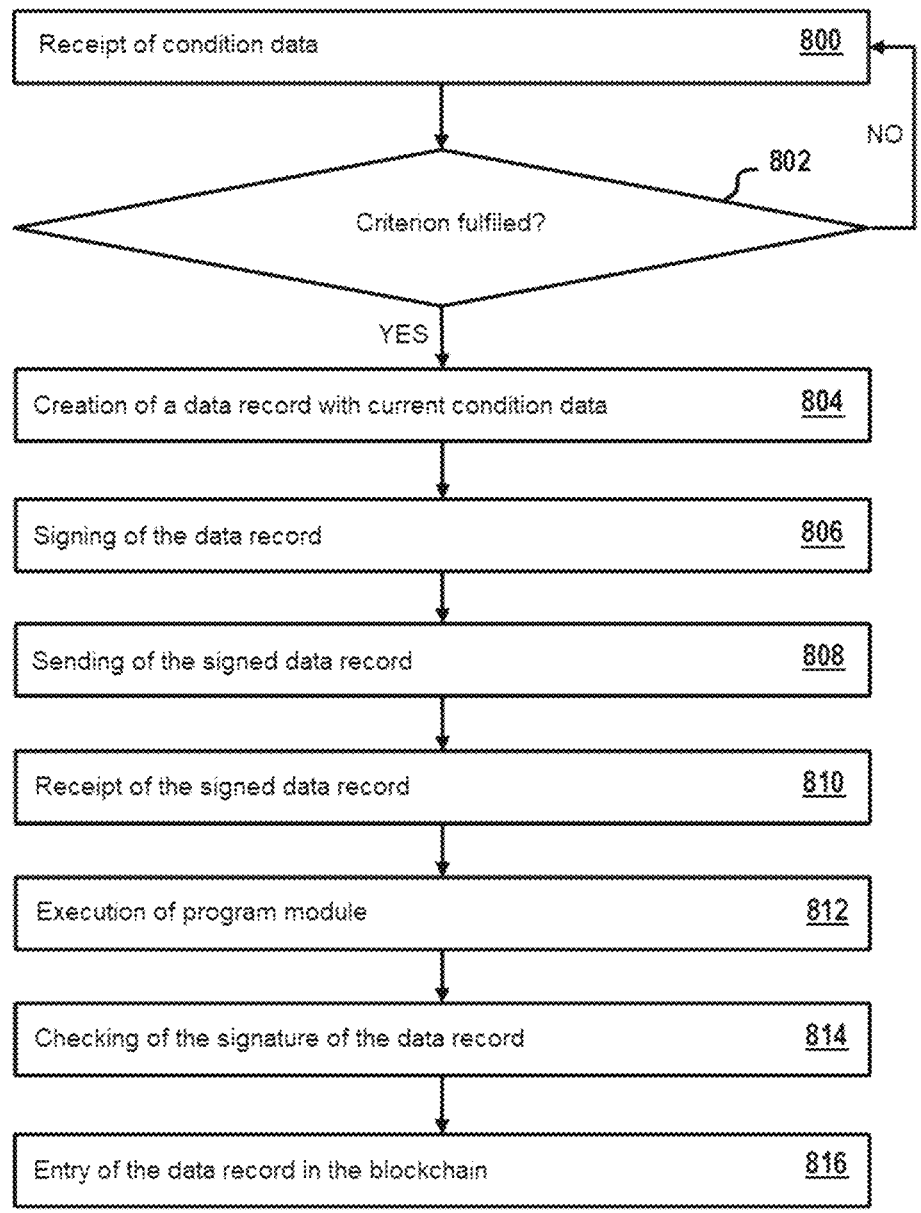
Figure 6:
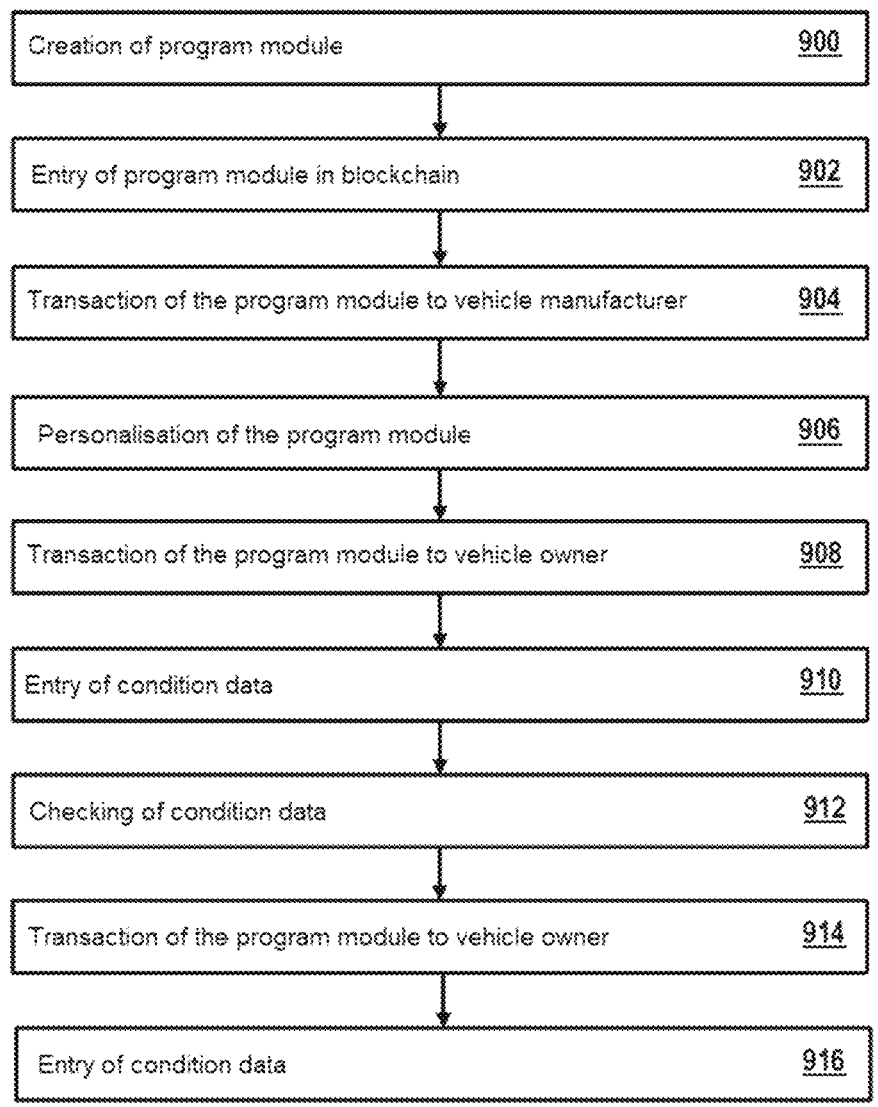
Figure 7:
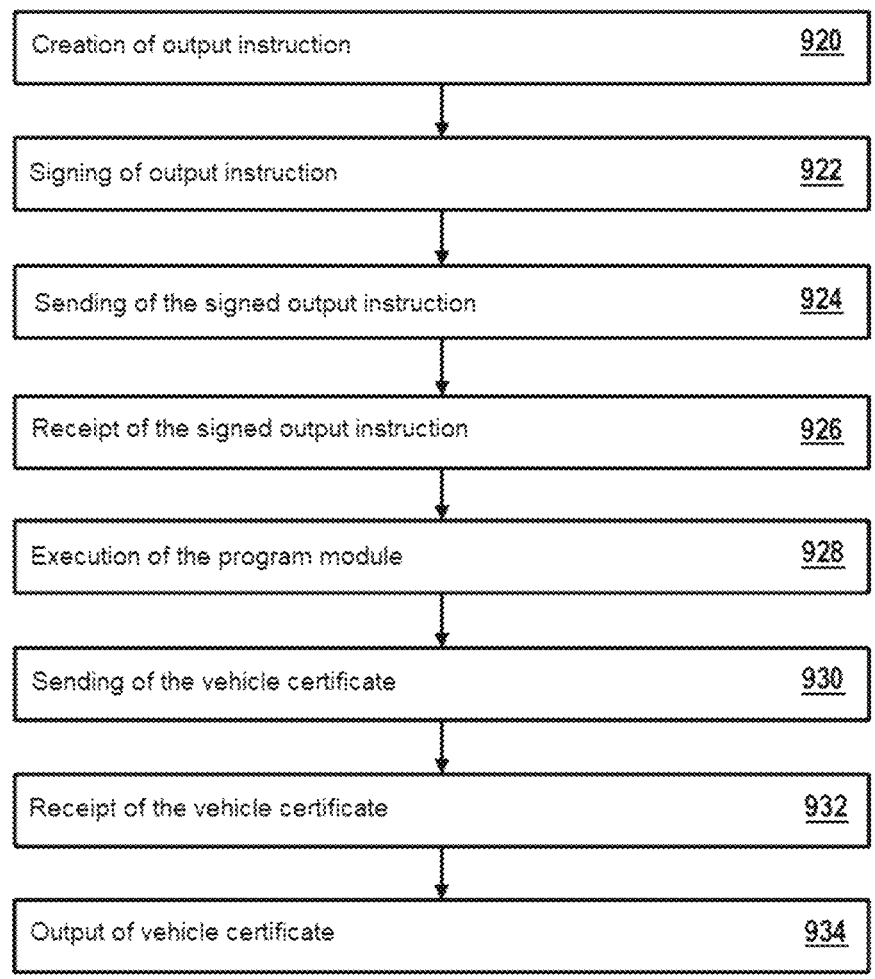
Figure 8:
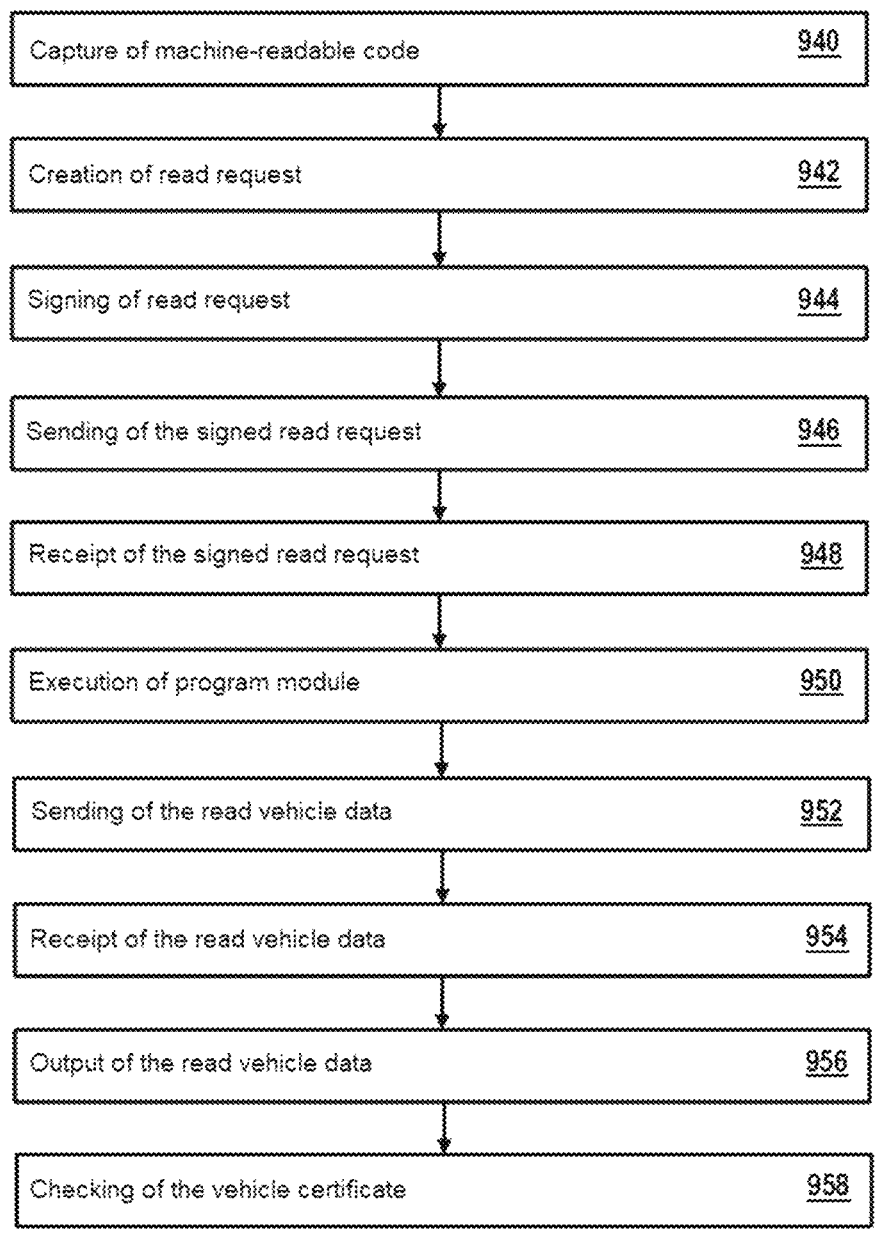
Figure 9:
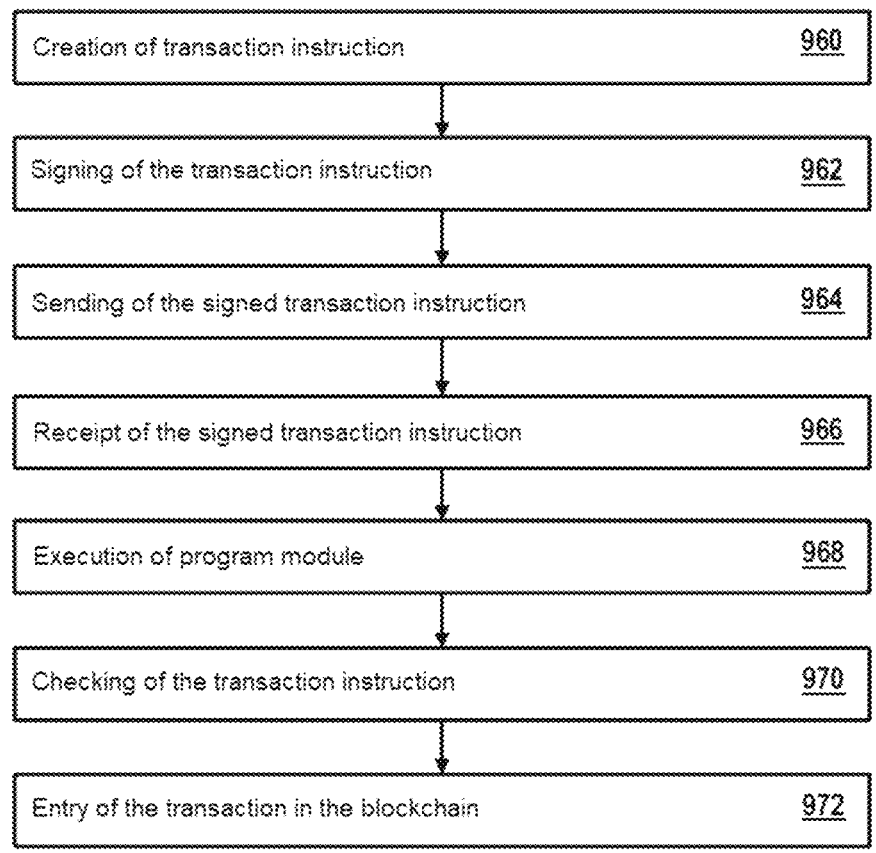
Figure 10:
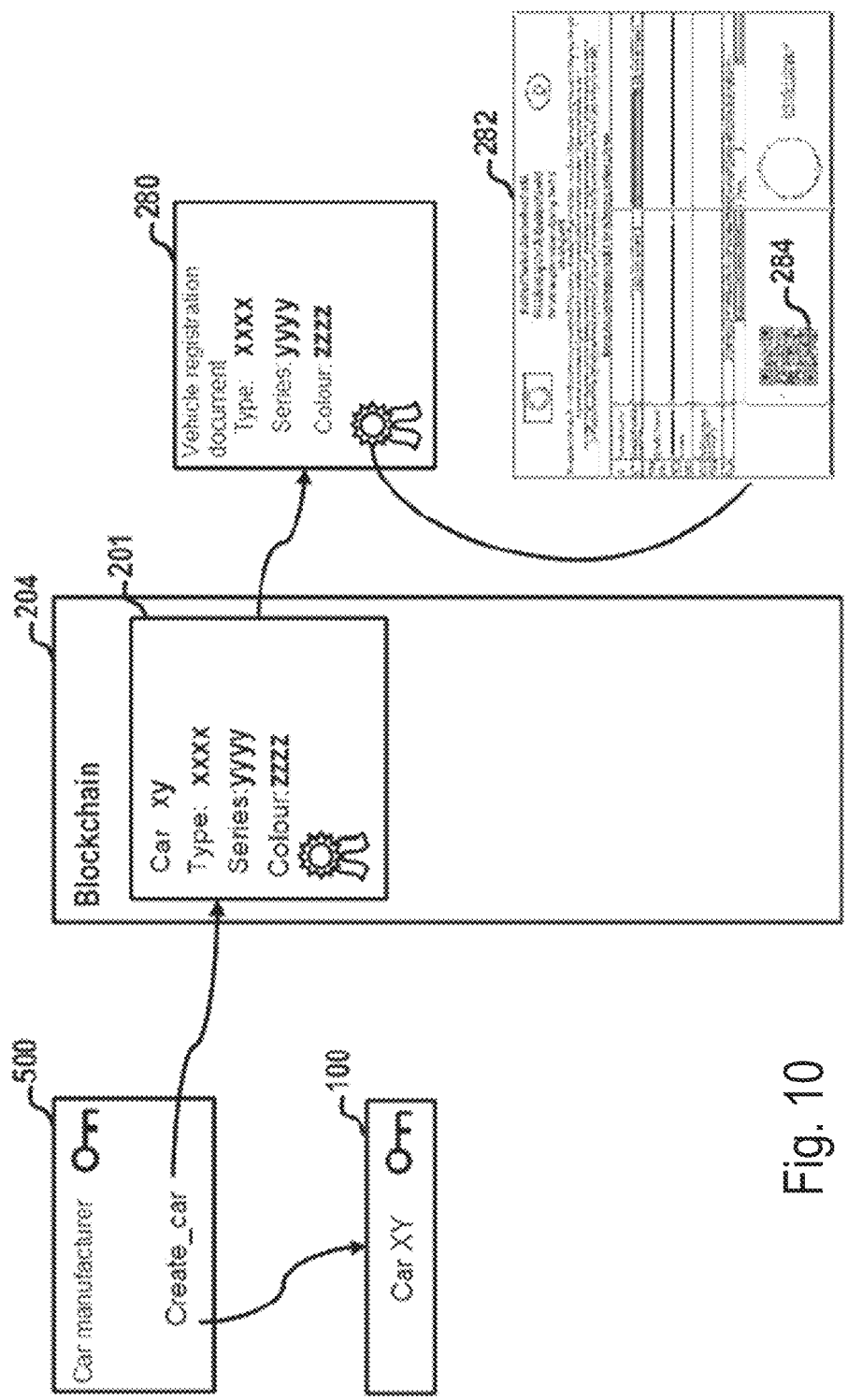
Figure 11:
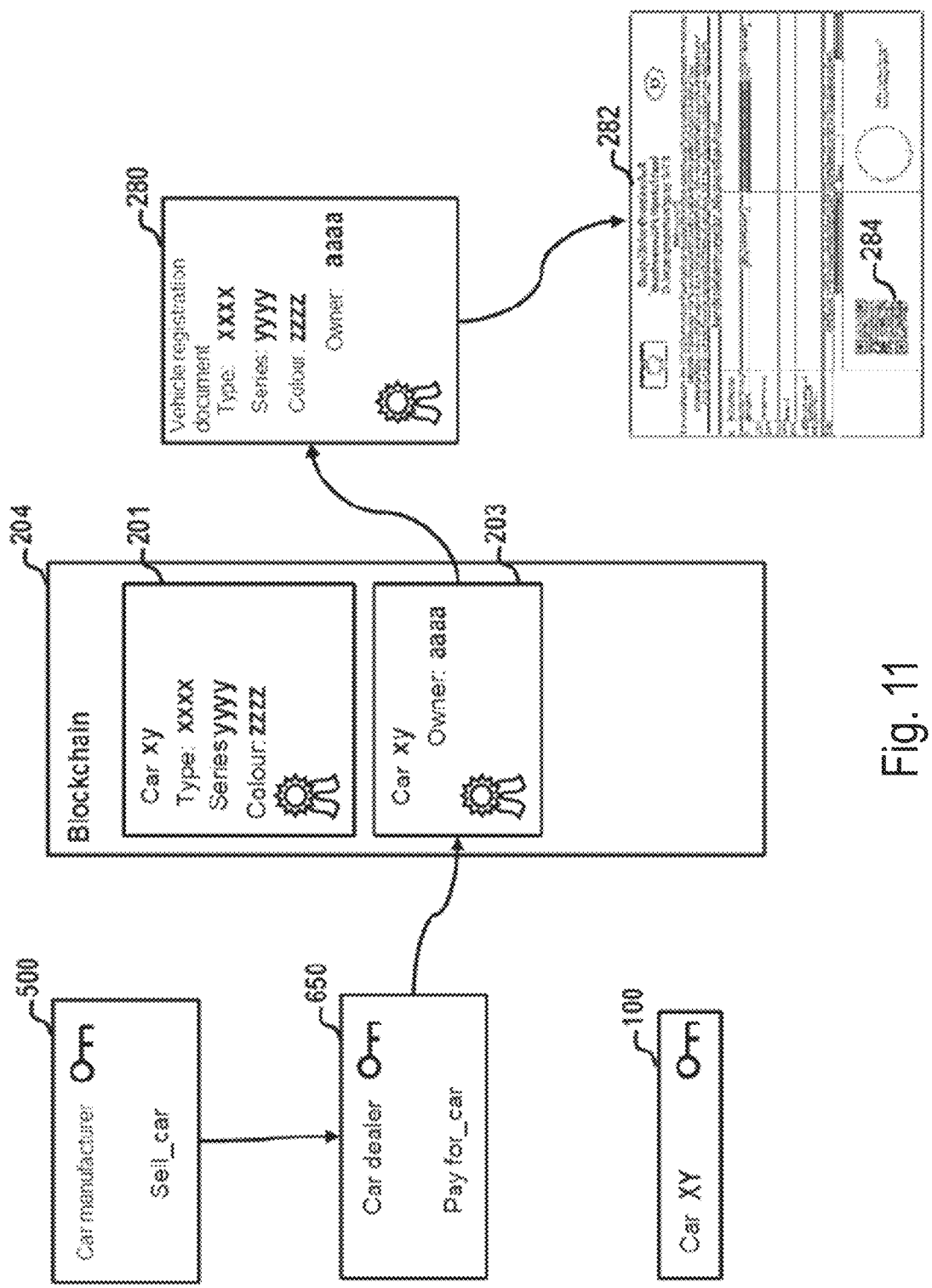
Figure 12:
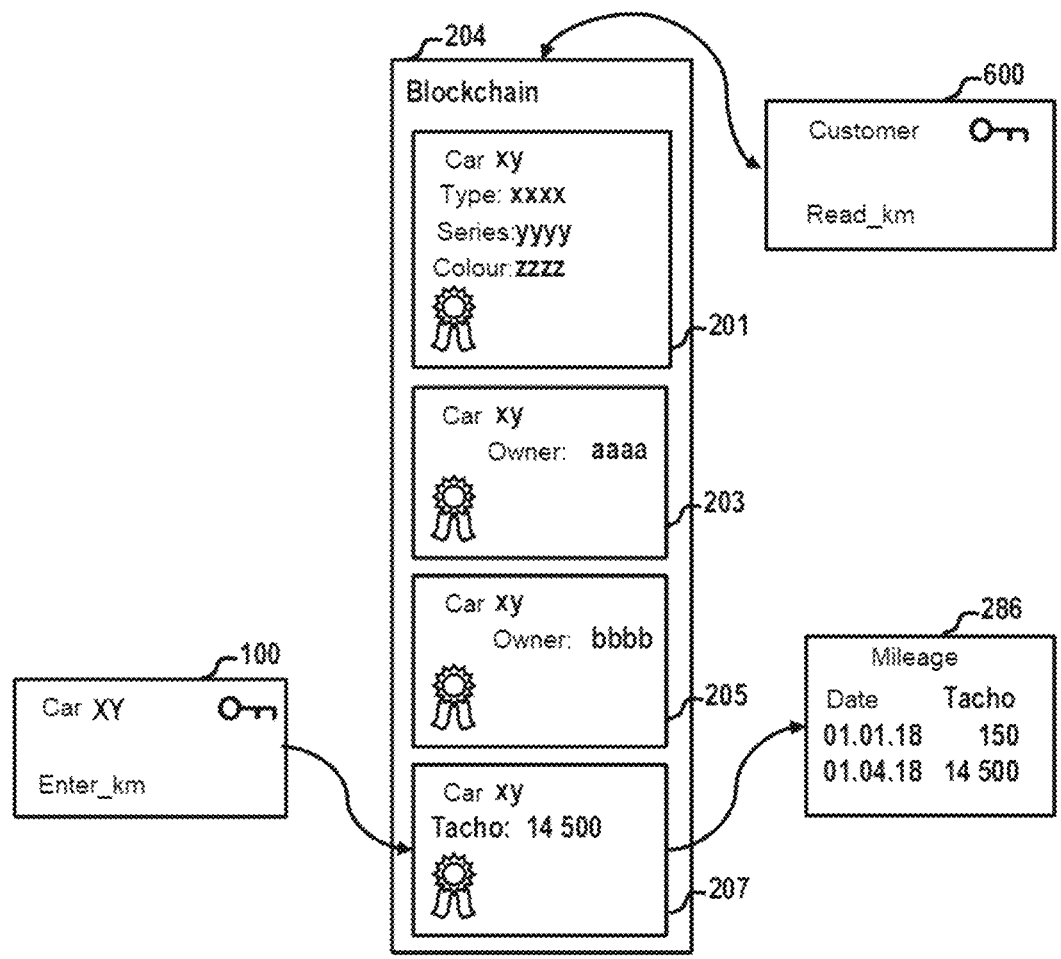
Figure 13:
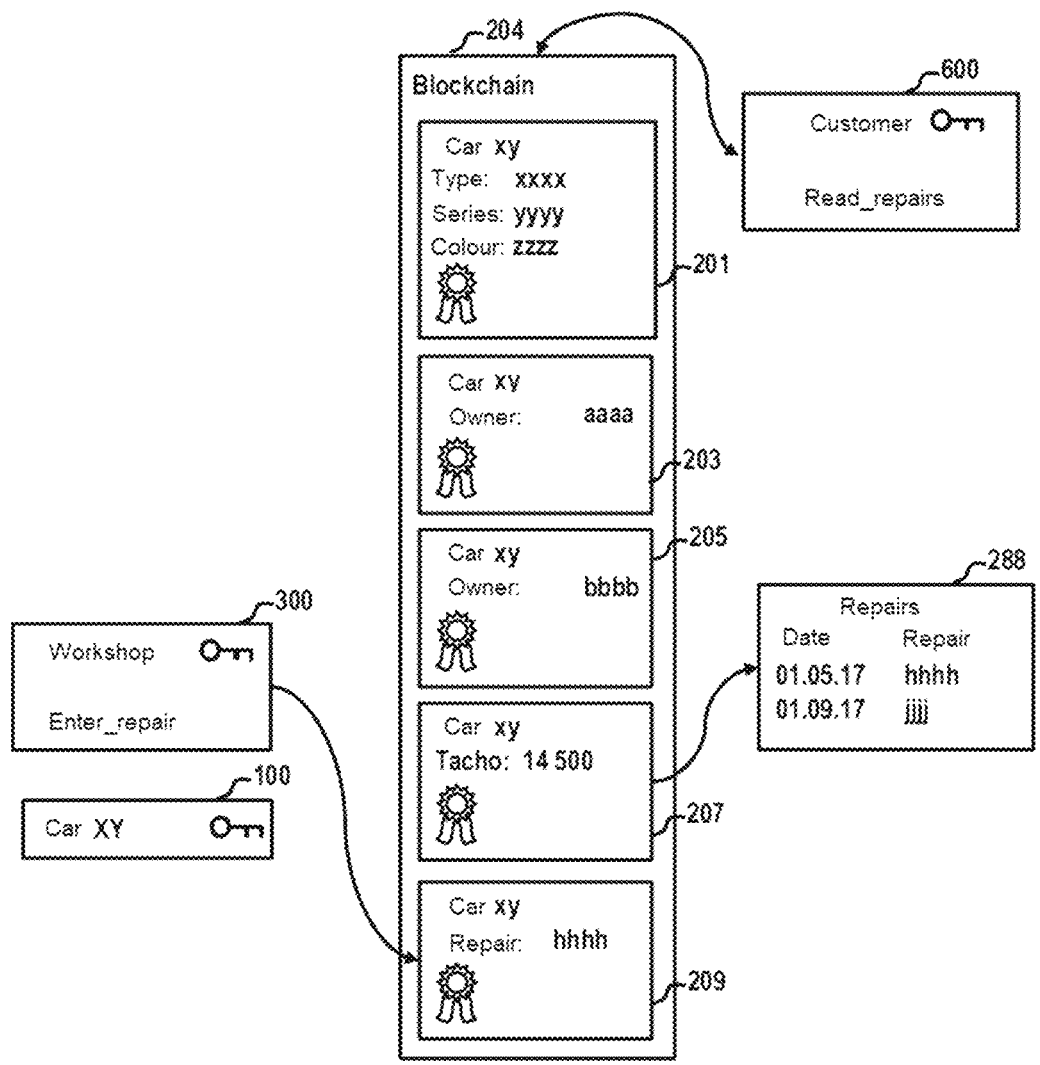

In the following, embodiments of the invention are explained in greater detail with reference to the drawings, in which:

FIG. 1 show block diagrams of a first embodiment of an exemplary system for the tamper-proof saving of vehicle data of a vehicle in a blockchain, FIG. 2 show block diagrams of a second embodiment of an exemplary system for the tamper-proof saving of vehicle data of a vehicle in a blockchain, shows a block diagram of an embodiment of an exemplary system for FIG. 3 capturing vehicle data of a vehicle, FIG. 4 shows a flow chart of a first embodiment of an exemplary method for the tamper-proof saving of vehicle data of a vehicle in a blockchain, FIG. 5 shows a flow chart of a second embodiment of an exemplary method for the tamper-proof saving of vehicle data of a vehicle in a blockchain, FIG. 6 shows a flow chart of a third embodiment of an exemplary method for the tamper-proof saving of vehicle data of a vehicle in a blockchain, FIG. 7 shows a flow chart of a fourth embodiment of an exemplary method for the tamper-proof saving of vehicle data of a vehicle in a blockchain, FIG. 8 shows a flow chart of an embodiment of an exemplary method for reading vehicle data of a vehicle saved in a tamper-proof manner in a blockchain, FIG. 9 shows a flow chart of an embodiment of an exemplary method for transferring ownership of a vehicle from a first owner to a second owner, FIG. 10 shows a block diagram of a method for the tamper-proof saving of vehicle data in a blockchain, FIG. 11 shows a block diagram of a method for the tamper-proof entry of an owner of the vehicle in the blockchain, FIG. 12 shows a block diagram of a method for the tamper-proof entry of vehicle condition data in the blockchain, and FIG. 13 shows a block diagram of a method for the tamper-proof entry of vehicle repair data in the blockchain.

Elements of the following embodiments that correspond to each other are denoted with the same reference signs.

Figure 1B:
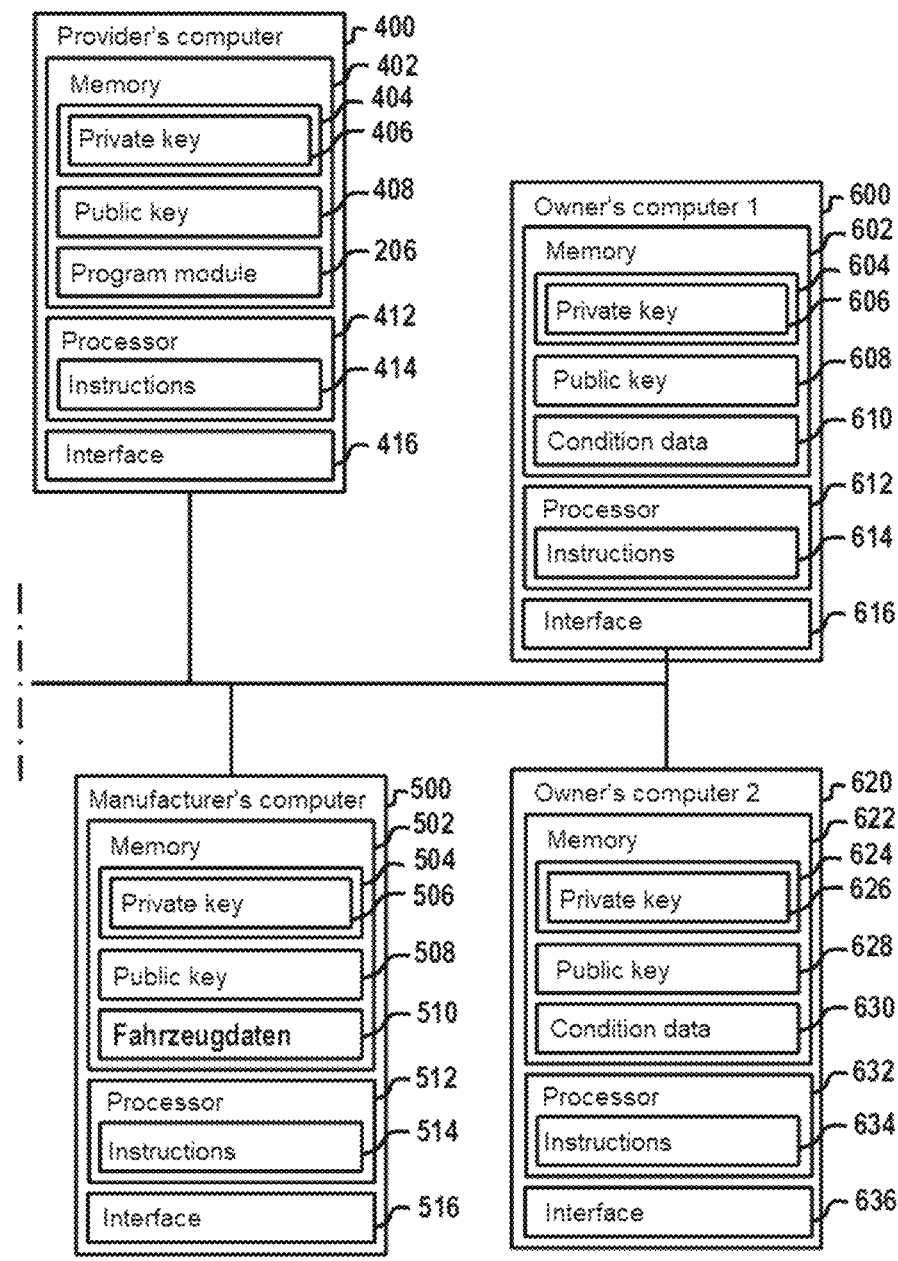

FIGS. 1A and 1B show a first embodiment of an exemplary system for the tamper-proof saving of vehicle data 110, 310, 510, 610 of a vehicle in a blockchain 204. The vehicle is, for example, an automobile, such as a passenger car. The vehicle comprises a vehicle computer system 100. The vehicle computer system 100 has a memory 102 in which a public cryptographic key 106 of an asymmetric key pair assigned to the vehicle is saved. The memory 102 also contains vehicle data 110 of the vehicle received by the vehicle computer system 100, for example from vehicle sensors 130, 150, 170 or a workshop's computer system 300. This vehicle data may include, for example, the vehicle's mileage. In addition, the memory 102 comprises a protected memory area 104 which may only be accessed by a processor 112 of the vehicle computer system 100 and in which a private cryptographic key 106 of the asymmetric key pair assigned to the vehicle is saved. The private cryptographic key 106 may be used to sign data records entered in the blockchain with vehicle data of the vehicle. The processor 112 is configured to execute program instructions 114, which cause the processor 112 to control the vehicle computer system 100 to create a record containing vehicle data 110 of the vehicle and save it in a blockchain 204. Lastly, the processor 112 may execute program instructions 114 that implement a cryptographic protocol. The cryptographic protocol may be used to cryptographically secure a data transmission between the vehicle computer system 100 and the workshop's computer system 300, the sensors 130, 150, 170 and/or the blockchain servers 200, 220, 240. In addition, the vehicle computer system 100 comprises a mobile communications interface 118 for communication via a mobile communications network 270. Via the mobile communications network 270, the vehicle computer system 100 may communicate with one or more of the blockchain servers 200, 220, 240 of the blockchain network 260. In addition, the vehicle computer system 100 comprises a sensor interface for communication with vehicle sensors 130, 150, 170, in particular for receiving sensor readings providing vehicle data of the vehicle.

The vehicle also comprises a number of on-board sensors 130, 150, 170, each of which has a sensor interface 132, 152, 172 for communication with the vehicle computer system 100 via an on-board network 276. If the sensor readings are to be transmitted to the vehicle computer system 100 in a cryptographically secured manner, i.e. encrypted and/or signed, the sensors 130, 150, 170 also each comprise a memory, possibly with a protected memory area, corresponding cryptographic keys, such as a cryptographic key pair assigned to the particular sensor, and a processor with program instructions for executing the cryptographically secured communication.

In addition, a workshop's computer system 300 may be provided, which comprises a memory 302. The computer system 300 may be a mobile diagnostic device or a personal computer. For example, it is a mobile diagnostic device in the form of a dedicated computer system with various diagnostic functions for the vehicle computer system and/or vehicle electronics. For example, the computer system 300 may be directly connected to the vehicle computer system and/or electronics via one or more cables 274. Desktop. The memory 302 contains a public cryptographic key 308 of an asymmetric key pair assigned to the workshop. The memory 302 also contains vehicle data 310 of the vehicle. These vehicle data 310 of the vehicle are provided for example by sensors of the workshop and/or include information regarding repair or maintenance work carried out by the workshop. Furthermore, this vehicle data may also include information provided by workshop staff regarding the condition of the vehicle, in particular regarding any defects found. In addition, the memory 302 comprises a protected memory area 304, which may only be accessed by a processor 312 of the computer system 300 and which saves a private cryptographic key 306 of the asymmetric key pair assigned to the workshop. The processor 312 is configured to execute program instructions 314, which causes the processor 312 to control the computer system 300 so that the vehicle data 310 of a vehicle is transferred to the vehicle computer system 100 for saving in the blockchain 204. To prove the authenticity of the corresponding vehicle data 310, the vehicle data 310 may be signed with the private cryptographic key 306. In addition, the authenticity of the asymmetric key pair assigned to the workshop may also be verified by a certificate and/or a corresponding PKI, for example. Lastly, the processor 312 may execute program instructions 114 which implement a cryptographic protocol. The cryptographic protocol may be used to cryptographically secure a data transmission between the workshop's computer system 300 and the vehicle computer system 100 via the communications link 274. For example, vehicle data 310 is encrypted with the public cryptographic key 108 of the vehicle computer system 100 before being sent to the vehicle computer system 100, so that it may be decrypted by the vehicle computer system 100 using the assigned private key 106.

In addition, the workshop's computer system 300 comprises a communications interface 316 to communicate with the vehicle computer system 100 and its communications interface 120 via the communications link 274. The communications link 274 may be, for example, a wireless or a wired communications link.

For example, the vehicle computer system 100 may communicate with the blockchain network 260 via the mobile communications network 270. The blockchain network 260 comprises at least one or more blockchain servers

200, 220, 240. The blockchain servers 200, 220, 240 each comprise a memory 202, 222, 242 with the blockchain 204, which memory in one of the blocks comprises a program module 206 assigned to the vehicle for entering vehicle data. The program module 206 contains program instructions. By executing these program instructions, an entry which contains vehicle data 110, 310, 510, 610 of the vehicle and which is assigned to the program module 206 and thus to the corresponding vehicle is generated in the blockchain 204. In addition, the program module 206 identifies the public cryptographic key 108 of the vehicle. For example, the public cryptographic key 108 is saved in one of the blocks of the blockchain. Furthermore, each of the blockchain servers 200, 220, 240 comprises a processor 208, 230, 250, which is configured to execute the program instructions provided by a program module 206 saved in the blockchain 204. Lastly, the blockchain servers 200, 220, 240 comprise a communications interface 210, 230, 250 for communication via the blockchain network 260 and/or the mobile network 270. The blockchain network 260 is, for example, a peer-to-peer network.

Furthermore, the communications interfaces 210, 230, 250 are configured for communication via the network 272. For example, a computer system 500 of a manufacturer of the vehicle, computer systems 600, 620 of successive owners of the vehicle and/or a computer system 400 of a provider of the program module 206 may communicate with one or more of the blockchain servers 200, 220, 240 via the network 272.

The computer system 400 of the provider of program module 206 comprises a memory 402 with a public cryptographic key 408 of an asymmetric key pair assigned to the provider. In addition, the memory 402 comprises the program module 206 created by the provider's computer system 400, which is saved in a block of the blockchain 204. In addition, the memory 402 comprises a protected memory area 404 to which access is only possible via a processor 412 of the computer system 400 and in which a private cryptographic key 406 of the asymmetric key pair assigned to the provider is saved. The processor 412 is configured to execute program instructions 414, the execution of which causes the processor 412 to control the computer system 400 so that it creates the program module 206 and transmits it to one of the blockchain servers 200, 220, 240 for saving in the blockchain 204. To prove the authenticity of the corresponding program module 206, it may be signed with the private cryptographic key 406. Furthermore, the program module 206 may be assigned in the blockchain to an address which corresponds to the public cryptographic key 408 of the provider. Therefore, the program module 206 is initially assigned to the provider, who therefore has the right of disposal of the program module 206. The authenticity of the asymmetric key pair assigned to the provider may also be verified by a certificate and/or a corresponding PKI. Lastly, the processor 412 may execute program instructions 414, which implement a cryptographic protocol. By means of the cryptographic protocol, a data transmission between the provider's computer system 400 and the blockchain servers 200, 220, 240 may be cryptographically secured. Lastly, the computer system 400 comprises a communications interface 416 for communication via the network 272. According to embodiments, the computer system 400 is, for example, a blockchain server of the blockchain network 260.

The vehicle manufacturer's computer system 500 comprises a memory 502 containing a public cryptographic key 508 of an asymmetric key pair assigned to the manufacturer. In addition, the memory 502 contains vehicle data 510 for personalising the program module 206, i.e. for assigning the program module 206 to the vehicle. For this purpose, the vehicle data 510 is saved in a block of the blockchain 204. The vehicle data 510 may also comprise initial vehicle data of the vehicle. In addition, the memory 502 comprises a protected memory area 504, which may only be accessed by a processor 512 of the computer system 500 and in which a private cryptographic key 506 of the asymmetric key pair assigned to the vehicle manufacturer is saved. The processor 512 is configured to execute program instructions 514, the execution of which causes the processor 512 to control the computer system 500 so that it personalises the program module 206, i.e. assigns the vehicle data 510 to the program module 206 and saves said data in the blockchain 204. In order to prove the authenticity of a corresponding data record containing the vehicle data 510, it may be signed with the private cryptographic key 506. Furthermore, the program module 206 in the blockchain may be assigned, for example, to an address which corresponds to the public cryptographic key 508 of the vehicle manufacturer. This means that the program module 206 may be assigned to the vehicle manufacturer for personalisation, who from now on has the right of disposal of the program module 206, as he also does for the vehicle produced by him. The authenticity of the asymmetric key pair assigned to the vehicle manufacturer may also be proven by a certificate and/or a corresponding PKI. Lastly, the processor 512 may execute program instructions 514 which implement a cryptographic protocol. The cryptographic protocol may be used to cryptographically secure, for example, a data transmission between the vehicle manufacturer's computer system 500 and the blockchain servers 200, 220, 240. Lastly, the computer system 500 comprises a communications interface 516 for communication via the network 272.

Computer systems 600, 620 of successive owners of the vehicle may also be provided, each comprising a memory 602, 622 with a public cryptographic key 608, 628 of an asymmetric key pair assigned to the corresponding vehicle owner. The memories 602, 622 also contain vehicle data 610, 630 of the vehicle. The vehicle data 610, 630 may for example include an indicator of a theft and/or immobilisation of the vehicle. Similarly, the vehicle data 610, 630 may also indicate, for example, the vehicle's mileage. In addition, memories 602, 622 each comprise a protected memory area 604, 624, which may only be accessed by a processor 612, 632 of the corresponding computer system 600, 620 and in which a private cryptographic key 606, 626 of the asymmetric key pair assigned to the vehicle owner is saved. The processors 612, 632 are configured to execute program instructions 614, 634, the execution of which causes the corresponding processor 612, 632 to control the computer system 600, 620 in such a way that a data record containing the vehicle data 610, 630 of the vehicle is generated for storage in the blockchain 204 and sent to one of the blockchain servers 200, 220, 240. To prove the authenticity of a corresponding data record containing the vehicle data 610, 630, it may be signed with the private cryptographic key 606, 626. Furthermore, the program module 206 may be assigned in the blockchain, for example, to an address which corresponds to the public cryptographic key 608, 628 of the vehicle owner. Therefore, for example, after the vehicle has been purchased by the owner, the program module 206 may be assigned to the corresponding vehicle owner, who from then on has the right of disposal of the program module 206, as he has also for the vehicle he has purchased. The authenticity of the asymmetric key pair assigned to the vehicle owner may also be proven, for example, by a certificate and/or a corresponding PKI. Lastly, processors 612, 632 may each execute program instructions 614, 634 which implement a cryptographic protocol. By means of the cryptographic protocol, data transfers between the computer systems 600, 620 of the vehicle owners and the blockchain servers 200, 220, 240 may be cryptographically secured. Lastly, the computer systems 600, 620 each comprise a communications interface 616, 636 for communication via the network 272.

FIGS. 2A and 2B show a second embodiment of an exemplary system for the tamper-proof saving of vehicle data 110, 310, 510, 610 of the vehicle in a blockchain 204. The system corresponds to a large extent to the system in FIGS. 1A and 1B. In contrast to the system shown in FIGS. 1, in the case of FIG. 2A, the workshop's computer system 300 is authorised to independently send data records containing vehicle data 310 to one or more of the blockchain servers 200, 220, 240 for entry in the blockchain 204. For this purpose, the computer system 300 is configured to communicate with the blockchain network 260 via the network 272 with its communications interface 316. According to further embodiments, the workshop's computer system 300 may also have vehicle data entered into the blockchain 204 via the vehicle computer system, as already shown in FIG. 1A. For this purpose, the computer system 300 according to FIG. 2A also has a communications link 274 as shown in FIG. 1A.

FIG. 3 shows an embodiment of an exemplary system for capturing vehicle data 110 of the vehicle. The vehicle computer system 100 corresponds to the embodiments shown in FIGS. 1A and 2A. In the case of FIG. 3, the vehicle's own sensors comprise a plurality of electronic components 140, 160, 180 of the vehicle electronics, which are connected to the vehicle computer system 100 via the vehicle's own network 276.

The electronic components 140, 160, 180 each comprise a memory 144, 164, 184 with a public cryptographic key 152, 172, 192 of an asymmetric key pair assigned to the corresponding electronic component 140, 160, 180. In addition, each of the memories 144, 164, 184 comprises a protected memory area 146, 166, 186, to which access is only possible via a processor 154, 174, 194 of the corresponding electronic component 140, 160, 180 and in which a private cryptographic key 148, 168, 188 of the asymmetric key pair assigned to the corresponding electronic component 140, 160, 180 is saved. In addition, an identifier 150, 170, 190 of the corresponding electronic component 140, 160, 180 is saved in the protected memory area 146, 166, 186. The processors 154, 174, 194 are configured to execute program instructions 156, 176, 196 which implement a cryptographically secured transmission of the identifiers 150, 170, 190 to the vehicle computer system 100. Lastly, the electronic components 140, 160, 180 each comprise a communications interface 142, 162, 182 for communication with the vehicle computer system 100 via the network 276.

The system according to FIG. 3 enables the vehicle computer system 100 to retrieve the identifiers, i.e. for example the serial numbers, of one or more components 140, 160, 180 of the vehicle electronics installed in the vehicle in order to compile vehicle data 110 of the vehicle. For example, on the basis of received serial numbers, the vehicle computer system 100 may create vehicle data in the form of a vehicle-specific code identifying the combination of the electronic components 140, 160, 180, which code is signed with the aid of the vehicle's private cryptographic key 106 and is transmitted to one of the blockchain servers 200, 220, 240 for entry in the blockchain. The electronic components 140, 160, 180 are, for example, engine electronic components, chassis electronic components and/or other electronic components, each of which may be designed as separate electronic control units (ECUs).

Before the electronic components 140, 160, 180 may be queried for their identifiers, e.g. serial numbers, these components must first be cryptographically authenticated, for example to each other and/or to the vehicle computer system 100 using the respective key pairs. The authenticity of the asymmetric key pairs assigned to the electronic components 140, 160, 180 may also be verified, for example, by certificates and/or a corresponding PKI.

For example, the vehicle computer system 100 or an authenticating electronic component generates a random number, in particular a pseudo-random number, which is encrypted with the public cryptographic key 152, 172, 192 of the electronic components 140, 160, 180 to be authenticated and sent via the network 276 to the corresponding electronic components 140, 160, 180 to be authenticated, for example the electronic component 140. The electronic component 140 receives the encrypted pseudo-random number, decrypts it using its private cryptographic key 148, and sends the decrypted pseudo-random number back to the vehicle computer system 100. According to embodiments, the electronic component 140 encrypts the pseudo-random number with the public cryptographic key 108 of the vehicle computer system 100. The vehicle computer system 100 receives the pseudo-random number from the electronic component 140 and decrypts it with its private cryptographic key 106 if necessary. Only if the pseudo-random number received from the vehicle computer system 100 matches the originally transmitted random number, the electronic component 140 is authenticated to the vehicle computer system 100, whereupon its identification 170 may be queried. The transmission of the identifier 170 may, for example, take place in encrypted form. For example, a symmetric key is used, which is calculated using the pseudo-random number.

If the cryptographic one of the electronic components 140, 160, 180 fails with respect to the vehicle computer system 100, the latter is unable to generate a corresponding code and therefore sends a corresponding error message as vehicle data of the vehicle to the blockchain servers 200, 220, 240, which then enter it in the blockchain 204.

If one of the electronic components 140, 160, 180 fails and has to be replaced by a new electronic component with a new identifier, replacing one of the electronic components 140, 160, 180 will change the condition of the vehicle, which will therefore also be reflected in an altered code. According to embodiments, the code is compared with the last calculated code. The last calculated code may, for example, be saved in the memory 102 of the vehicle computer 100 or may be retrieved from the blockchain 204. If the newly calculated code differs from the last calculated code, the data record created by the vehicle computer 100 with the new code additionally comprises, for example, all individual identifiers 150, 170, 190 of the electronic components 140, 160, 180. According to further embodiments, all identifiers 150, 170, 190 of all electronic components 140, 160, 180 are initially saved in the blockchain 204. Subsequently, when the combination is changed, only those identifiers which have changed, i.e. which are new, are saved in the blockchain together with the new code. This means that when one of the electronic components 140, 160, 180 is replaced, the blockchain 204 may also be used to determine which of the electronic components 140, 160, 180 has been replaced.

FIG. 4 shows a first embodiment of an exemplary method for the tamper-proof saving of vehicle data of a vehicle in a blockchain. The vehicle data is compiled, for example, by a computer system of the vehicle itself and sent to a blockchain server of a blockchain network for entry in the blockchain. Vehicle data is received in block 700. This vehicle data may, for example, come from the vehicle's own sensors or external sensors. Depending on the design of the sensors, authentication of one or more sensors by the vehicle computer system and/or authentication of the vehicle computer system by one or more of the sensors may be provided before the sensor readings are transmitted. Authentication may, for example, take place using asymmetric key pairs assigned to the devices to be authenticated.

For example, if sensor readings are provided by a computer system of an authorised repairer, the vehicle computer system may, for example, comprise an asymmetric key pair consisting of a public cryptographic key and a private cryptographic key and a certificate assigned to this key pair and assigned to the vehicle concerned. The vehicle is noted in the certificate. In addition, the authorised repairer's computer system also comprises an asymmetric key pair consisting of a public cryptographic key and a private cryptographic key and a certificate assigned to this key pair and assigned to the authorised repairer in question. The authorised repairer is identified in the certificate.

For example, to perform mutual cryptographic authentication, the vehicle computer system and/or the workshop's computer system generates a random number, in particular a pseudo-random number. The pseudo-random number(s) are exchanged between the vehicle computer system and the workshop's computer system in encrypted form using the corresponding private cryptographic key of the vehicle computer system and/or the workshop's computer system. In addition, the encrypted pseudo-random number is accompanied by a certificate containing the public key for decrypting the pseudo-random number. Therefore, the vehicle computer system and/or the workshop's computer system may be authenticated by the possession of the corresponding private key.

According to a further embodiment, a random number, in particular a pseudo-random number, is first calculated by the vehicle computer system and/or the workshop's computer system for authentication. The corresponding pseudo-random number is encrypted with the public cryptographic key of the recipient computer system and sent to the corresponding recipient computer system. The recipient computer system may decrypt the received encrypted pseudo-random number with its private cryptographic key. According to embodiments, the pseudo-random number is then encrypted with the public cryptographic key of the original sender computer system and sent back to the sender computer system. The original sender computer system may decrypt the pseudo-random number with its private cryptographic key and compare it with the original pseudo-random number. If they match, the recipient computer system is authenticated. An analogous method may now be used in reverse to authenticate the sender computer system. In addition, the pseudo-random number may also be used to calculate a symmetric cryptographic key to encrypt further communication between the computer systems.

For example, sensor data may be transmitted in response to a request from the vehicle computer system. According to an alternative embodiment, the transmission by the sensor takes place automatically. Such an automatic transmission may, for example, be based on the fulfilment of a predefined criterion. Such a predefined criterion may be, for example, the expiry of a predefined time interval, or a sensor reading fulfils a corresponding criterion. For example, the sensor measured value is above or below a predefined threshold value.

In block 702, the vehicle computer system creates a data record for entry in the blockchain, which data record contains the vehicle data to be entered and also identifies the program module assigned to the vehicle. The program module may be identified, for example, by an identifier, an address assigned to the program module or an identifier of the block comprising the program module. In block 704, the vehicle computer system signs the data record with a private cryptographic key assigned to the vehicle computer system. In block 706, the signed data record is sent to a blockchain server of the blockchain network for entry into the blockchain. In block 708, the blockchain server receives the data record. Based on the data record, the blockchain server identifies the program module to be used, which is saved in the blockchain. In block 710, the program module is executed by the blockchain server using the received data record. In block 712, the signature of the data record is checked. For example, the public cryptographic key of the vehicle computer system is saved in the blockchain. The vehicle computer system is only authorised to enter vehicle data in the blockchain if it has been validly registered for this purpose. For example, it is checked whether the public cryptographic key of the vehicle computer for the program module is saved validly in the blockchain, i.e. whether the corresponding public cryptographic key is saved in a block of the blockchain together with an identifier of the program module and a signature of the provider of the program module. Alternatively, the corresponding public cryptographic key may be saved with a signature which may be traced back to a signature of the provider of the program module by a chain of signatures saved in the blockchain. According to embodiments, the blockchain may also comprise certificates which contain corresponding public cryptographic keys for checking signatures and prove their authenticity. According to embodiments, the authenticity of corresponding certificates is verified, for example, by a PKI provided by the blockchain.

If the check reveals that the signature of the data record to be entered in the blockchain is valid, the blockchain server enters the data record with the vehicle data of the vehicle in block 714. According to embodiments, the entry comprises a timestamp. According to embodiments, the timestamp is the time of measurement of the measured values on which the vehicle data is based, the time of creation of the data record and/or the time of entry in the blockchain.

FIG. 4 is described here with reference to the vehicle computer system. Similarly, entries of vehicle data and vehicle specifications may be made from other computer systems, such as a provider computer system, a workshop's computer system, a vehicle manufacturer's computer system and/or a vehicle owner's computer system. According to the embodiments, a precondition for this is that the corresponding computer systems are authorised to make such entries. As in the case of the vehicle computer system, such authorisation may be granted by a signed deposit of a public cryptographic key assigned to the computer system.

FIG. 5 shows a second embodiment of an exemplary method for the tamper-proof saving of vehicle data of a vehicle in a blockchain. As in step 700 of FIG. 2, vehicle data is received in step 800 of FIG. 3. In step 802 it is checked whether a predefined criterion for creating a data record with the received vehicle data and entering the corresponding data record in the blockchain is fulfilled. If the criterion is fulfilled, the method in block 804 is continued with the creation of a data record containing the current vehicle data. If the criterion is not fulfilled, the method is continued in block 800 until the criterion is fulfilled. The criterion may be a time criterion, for example. If a predefined time period has expired, an entry is made in the blockchain. The current vehicle data includes, for example, either the last recorded vehicle data or all data received in the time interval since the last creation of a data record. A criterion for creating a data record may, for example, also be the end of a journey, with a journey beginning, for example, with the starting of the vehicle's ignition and ending with the switching off of the ignition. If the vehicle data is vehicle data for which only the most current value is relevant in each case, such as the vehicle's mileage, only the most recently recorded and therefore most current measured value is included in the data record, according to embodiments. If the vehicle data is vehicle data for which all measured values are relevant, such as for error messages, all vehicle data recorded in the relevant time interval are included in the data record, according to embodiments. Furthermore, the criterion may be, for example, a measured value that exceeds or falls below a threshold value. For example, relevant vehicle data, such as a current mileage, are entered when a certain mileage is reached. For example, an entry is made every 100 km, 500 km, 1,000 km, 2,000 km, 5,000 km or 10,000 km. The other steps 804 to 816 are analogous to steps 702 to 714 in FIG. 4.

FIG. 6 shows a third embodiment of an exemplary method for the tamper-proof saving of vehicle data of a vehicle in a blockchain. In block 900, a program module is created by the provider computer system. The authenticity of the program module is verified, for example, by a signature with a private cryptographic key assigned to the provider. The authenticity of the signature may be verified, for example, by a corresponding public cryptographic key, if necessary in combination with a corresponding certificate. In block 902, the program module is entered in the blockchain. For example, according to embodiments, only a certain provider or only a limited number of providers may enter program modules in the blockchain. For example, the program module has not yet been assigned to a specific vehicle. Rather, the program module comprises program instructions which define certain data types and participant types of the logging method, such as vehicle data and vehicle specifications, a provider of the program module, a vehicle, a manufacturer of the vehicle, an owner of the vehicle, or a workshop. According to embodiments, the program module is initially assigned to an address of the provider, which comprises, for example, a public key assigned to the provider.

In block 904, a transaction of the program module is carried out from the address of the provider to an address of the vehicle manufacturer. For example, the address assigned to the vehicle manufacturer comprises a public cryptographic key of the vehicle manufacturer. In addition to the transaction of the program module to the address of the vehicle manufacturer, the vehicle manufacturer is cleared to personalise the program module for a specific vehicle. Clearance may be granted, for example, by the provider calling up the program module's functions correspondingly, or by the vehicle manufacturer entering a password. The corresponding password is made available to the vehicle manufacturer by the provider, for example. The password is, for example, a one-time password, such as a TAN. The password is provided to the vehicle manufacturer by the provider, for example via a cryptographically secured connection between a vehicle manufacturer's computer system and a provider's computer system. For example, the cryptographically secured connection is an encrypted end-to-end connection. An "encrypted end-to-end connection" or an "encrypted end-to-end transmission channel", here, means a connection between a sender and a recipient with end-to-end encryption, in which data to be transmitted is encrypted by the sender and only decrypted again by the recipient. The encryption of transmitted data is thus carried out across all transmission stations, so that intermediate stations are unable to gain knowledge of the content of the transmitted data, due to the encryption. The connection is cryptographically secured by the encryption to prevent spying and/or manipulation of the transmission, and a so-called secure messaging method may be used for this purpose. For example, end-to-end encryption is based on two symmetric cryptographic keys, with a first of the symmetric keys being used to encrypt messages and a second of the symmetric keys being used to authenticate the sender of the message.

The key for authenticating the sender of the message may be used to create a message authentication code (MAC), for example. A MAC may be used to obtain certainty about the origin of messages and to verify their integrity. MAC algorithms require two input parameters, firstly the data that are to be protected and secondly a secret key. From these two, a message authentication code is calculated in the form of a checksum. The sender of a message calculates a MAC for the message data to be transmitted and sends the message to the recipient together with the MAC. The recipient calculates the MAC for the received message with his key and compares the calculated MAC with the received MAC. If both values match, it follows that the message was sent by a party that has access to the secret key and the message was not modified during transmission.

In block 906, the program module is personalised by the vehicle manufacturer, i.e. the program module is assigned to the vehicle. For this purpose, for example, an entry signed with the private cryptographic key of the vehicle manufacturer is generated in the blockchain, which assigns a public cryptographic key of the vehicle to the program module. In addition, the entry may comprise vehicle specifications of the vehicle, i.e. attributes of the vehicle.

In block 908, a transaction of the program module is carried out from the address of the vehicle manufacturer to an address of a vehicle owner who purchases the vehicle from the vehicle manufacturer. For example, the address assigned to the vehicle owner comprises a public cryptographic key of the vehicle owner. In block 910, vehicle data of the vehicle are entered into the blockchain using the program module, for example by the vehicle computer system.

In block 912, for example, the vehicle data of the vehicle may now be checked by a prospective buyer. According to embodiments, vehicle data which are not public are encrypted and entered in the blockchain. For example, corresponding vehicle data are encrypted with a public cryptographic key of the registering computer system, so that it may only be decrypted by the registering computer system with its private cryptographic key. In block 914, a transaction of the program module is carried out from the address of the previous vehicle owner to an address of a new vehicle owner who acquires the vehicle from the previous vehicle owner. For example, the address assigned to the new vehicle owner comprises a public cryptographic key of the new vehicle owner. In block 916, vehicle data of the vehicle will continue to be entered in the blockchain, for example by the vehicle computer system.

FIG. 7 shows an embodiment of an exemplary method for outputting a vehicle certificate using vehicle data of a vehicle saved in a tamper-proof manner in a blockchain. In block 920, an output instruction for outputting the vehicle certificate is generated by a computer system of a vehicle owner. The output instruction identifies the program module assigned to the vehicle, which provides program instructions for creating the vehicle certificate in the blockchain.

In block 922, the output instruction is signed with a private cryptographic key of the owner of the vehicle. For example, the corresponding private cryptographic key is saved in a protected memory area of a memory in the computer system. In block 924, the signed output instruction is sent by the owner's computer system to a blockchain server of the blockchain network via a network. According to embodiments, the instruction is sent, for example, by using an end-to-end encrypted communications link.

In block 926, the blockchain server receives the signed output instruction, and in block 928, it executes program instructions of the program module identified by the output instruction. Executing the program instructions involves checking the signature of the received output instruction using a public cryptographic key of the owner. For example, the corresponding public cryptographic key of the owner is saved in the blockchain and assigned to the program module. For example, the corresponding owner is registered as the current owner of the vehicle in the blockchain. In case the verification shows that the signature of the output instruction is valid, the requested vehicle certificate is generated by reading the current values saved in the blockchain for the data comprised by the vehicle certificate. The current values are, for example, the last value saved for the particular information. In block 930, the vehicle certificate is sent to the owner's computer system by the blockchain server in response to the output instruction. This is done, for example, via an end-to-end encrypted communications link.

In block 932, the owner's computer system receives the vehicle certificate and outputs it in block 934. The output may be implemented, for example, by printing the vehicle certificate or by displaying it on a display of the computer system, especially if the computer system is a mobile portable communications device. The vehicle certificate output in this case comprises a machine-readable code. This machine-readable code identifies the program module assigned to the vehicle and provides a private cryptographic key of an asymmetric key pair for reading the current values for the data in the vehicle certificate. By capturing the machine-readable code, the private cryptographic key may be extracted and used as proof of a read authorisation to read the corresponding values from the blockchain. In the blockchain, a public cryptographic key assigned to the corresponding private cryptographic key is identified, e.g. saved as a verification value for checking a signature of a read request to read vehicle data of the vehicle certificate from the blockchain. The corresponding vehicle data may be read from the blockchain and compared with the details of the vehicle certificate. If the values match, the vehicle certificate is valid.

FIG. 8 shows an embodiment of an exemplary method for reading tamper-proof vehicle data of a vehicle saved in a blockchain. In block 940, the machine-readable code provided by the output vehicle certificate is captured by a reader of a checking computer system. For example, the reader is an optoelectronic reader for capturing a code printed in machine-readable form on the vehicle certificate or a code shown on a display as part of the vehicle certificate. In block 942, a read request with the identification of the program module for reading vehicle data of the vehicle certificate from the blockchain is created using the captured machine-readable code. In block 944, the read request is signed with the private cryptographic key provided by the machine-readable code. If the private cryptographic key provided is encrypted, it is first decrypted. In block 946, the signed read request is sent by the checking computer system to a blockchain server of the blockchain network via a network, such as a mobile communications network if the checking computer system is a mobile portable telecommunications device.

In block 948, the signed read request is received by the blockchain server, and, in block 950, program instructions of the program module identified by the read request are executed. Execution of the program instructions involves checking the signature of the read request using the public cryptographic key identified by the program module to check read requests. If the signature is valid, the requested vehicle data of the vehicle certificate is read from the blockchain. In block 952, the read vehicle data is sent to the checking computer system by the blockchain server in response to the read request, and, in block 954, the read vehicle data are received by the check computer system. In block 956, the read vehicle data is output by the checking computer system, e.g. shown on a display, and in block 958 a check of the vehicle certificate is carried out. For example, the vehicle data according to the vehicle certificate is compared with the read vehicle data. If there is a match, the vehicle certificate is valid; if there are discrepancies, the vehicle certificate is invalid.

FIG. 9 shows an embodiment of an exemplary method for transferring the ownership of a vehicle from a first owner to a second owner. In block 960, a transaction instruction is provided for the transaction of the program module from an address assigned to the first vehicle owner, which address is assigned to an asymmetric key pair of the first vehicle owner, to an address assigned to a second vehicle owner. In block 962 the transaction instruction is signed by the vehicle owner's computer system, i.e. the first owner, with the private cryptographic key of the first owner. In block 964, the signed transaction instruction is sent by the computer system of the first vehicle owner via a network to a blockchain server of the blockchain network.

In block 966, the blockchain server receives the transaction instruction. In block 968, the blockchain server executes program instructions of the program module identified by the transaction instruction. In block 970, it is checked during the course of implementation that the first transaction instruction is validly signed with the private cryptographic key assigned to the address of the first vehicle owner. In block 972, if the signature is valid, the transaction instruction is added to an additional block for the blockchain.

FIG. 10 shows a block diagram of a method for the tamper-proof saving of vehicle data in a blockchain 204. A vehicle manufacturer, for example a manufacturer of a car, has a manufacturer's computer system 500. The manufacturer produces a car which comprises a vehicle computer system 100. Both the manufacturer's computer system 500 and the vehicle computer system 100 each comprise a private cryptographic key to prove authorisations. During the course of production, the vehicle manufacturer creates a data record characterising the vehicle and saves it in an entry 201 in the blockchain 204 using a program module provided by the blockchain 204. This entry comprises, for example, a vehicle ID, a vehicle type designation, a serial number, a colour designation, etc. To output a vehicle certificate 282, the data record 280 characterising the vehicle may be read from the blockchain 280 and output in the form of a vehicle certificate 282, e.g. printed out or shown on a display. The vehicle certificate 282 comprises, for example, a machine-readable code 284, with which data relating to the vehicle in the blockchain 2904 may be identified and read. This allows, for example, the validity of the information of the vehicle certificate 282 to be checked using the blockchain 204.

FIG. 11 shows a block diagram of a method for the tamper-proof entry of an owner of the vehicle in the blockchain 204. The vehicle is delivered or sold by the manufacturer to a dealer who has a dealer computer system with a private cryptographic key assigned to the dealer to prove the dealer's authorisation. Depending on embodiments, the sale may also be processed via the blockchain 204. Where the transaction involves the transfer of an amount of cryptographic currency from an address assigned to the dealer to an address assigned to the manufacturer. During the course of delivery, for example, an entry 203 is added to the blockchain, which identifies the car dealer as the owner of the vehicle. If a vehicle certificate is output after delivery of the vehicle, the data record characteristic of the vehicle will also comprise information identifying the dealer as the current owner of the vehicle.

FIG. 12 shows a block diagram of a method for the tamper-proof entry of vehicle condition data in the blockchain 204, such as a vehicle mileage. The vehicle has been sold by the dealer to a customer, and so the blockchain comprises another entry 205, which indicates a change of ownership. The vehicle computer system 100 records a current mileage and enters it into another entry 207 of the blockchain 204. Therefore, for example, a data record 286 with a history of the mileage of the vehicle may be read from the blockchain 204 by an owner of the vehicle. For example, the owner has an owner computer system 600 with a private cryptographic key assigned to the owner. With this private cryptographic key, the owner may, for example, prove his authorisation to read the history of the mileage. The history of the mileage may be used to effectively detect tachomanipulation.

FIG. 13 shows a block diagram of a method for the tamper-proof entry of repair data of the vehicle in the blockchain 204. If a workshop carries out a repair on the vehicle, for example using a workshop's computer system 300 with a private cryptographic key assigned to the workshop as signature key, an entry 209 is created in the blockchain containing data regarding the repair. The owner of the vehicle may use his owner computer system 600 to read a history of the repair work carried out on the vehicle from the blockchain. Upon a corresponding request signed with his private cryptographic key, the owner receives a data record 288 containing the history of the repair work carried out on the vehicle.

LIST OF REFERENCE SIGNS 100 vehicle computer system
102 memory
104 protected memory area
106 private cryptographic key
108 public cryptographic key
110 vehicle data
112 processor
114 program instructions
116 sensor interface
118 mobile communications interface
120 communications interface
130 sensor
131 sensor interface
132 sensor
133 sensor interface
134 sensor
135 sensor interface
140 electronic component
142 sensor interface
144 memory
146 protected memory area
148 private cryptographic key
150 identifier
152 public cryptographic key
154 processor
156 program instructions
160 electronic component
162 sensor interface
164 memory
166 protected memory area
168 private cryptographic key
170 identifier
172 public cryptographic key
174 processor
176 program instructions
180 electronic component
182 sensor interface
184 memory
186 protected memory area
188 private cryptographic key
190 identifier
192 public cryptographic key
194 processor
196 program instructions
200 blockchain server
201 entry
202 memory
203 entry
204 blockchain
205 entry
206 program module
207 entry
208 processor
209 entry
210 communications interface
220 blockchain server
222 memory
228 processor
230 communications interface
240 blockchain server
242 memory
248 processor
250 communications interface
260 blockchain network
270 mobile communications network
272 network
274 communications link
276 network
280 data record
282 vehicle certificate
284 machine-readable code
286 data record
288 data record
300 workshop's computer system
302 memory
304 protected memory area
306 private cryptographic key
308 public cryptographic key
310 vehicle data 312 processor
314 program instructions
316 communications interface
400 provider computer system
402 memory
404 protected memory area
406 private cryptographic key
408 public cryptographic key
412 processor
414 program instructions
416 communications interface
500 manufacturer's computer system
502 memory
504 protected memory area
506 private cryptographic key
508 public cryptographic key
510 vehicle data
512 processor
514 program instructions
516 communications interface
600 owner's computer system
602 memory
604 protected memory area
606 private cryptographic key
608 public cryptographic key
610 vehicle data
612 processor
614 program instructions
616 communications interface
620 owner's computer system
622 memory
624 protected memory area
626 private cryptographic key
628 public cryptographic key
630 vehicle data
632 processor
634 program instructions
636 communications interface
650 dealer's computer system

The invention claimed is:

1. A method for the tamper-proof saving of vehicle data of a vehicle in a blockchain, wherein the blockchain comprises, in a block, a program module with first and second program instructions, wherein the program module is assigned to the vehicle, wherein, by executing the first program instructions, an entry which is assigned to the program module and which contains vehicle data of the vehicle is generated in the blockchain, wherein, by executing the second program instructions, a vehicle certificate containing a first data record characterising the vehicle is created, wherein the first data record comprises vehicle data saved in an entry of the blockchain assigned to the program module, wherein the program module is assigned to a first public cryptographic key of a first asymmetric key pair of a first vehicle owner, wherein a private cryptographic key of the first asymmetric key pair is saved in a memory of a computer system of a first owner of the vehicle, the vehicle comprising a computer system that does not include the computer system of the first owner of the vehicle, wherein the method comprises:

creating, by the computer system of the first owner, an output instruction for outputting the vehicle certificate, wherein the output instruction identifies the program module assigned to the vehicle, signing, by the computer system of the first owner, the output instruction with the first private cryptographic key, sending the signed output instruction by the computer system of the first owner via a first communications network to a blockchain server of a plurality of blockchain servers of the blockchain network configured to execute the program instructions of the program module, receiving the signed output instruction by the blockchain server, executing, by the blockchain server, the second program instructions of the program module identified by the output instruction, wherein executing the second program instructions comprises checking the signature of the output instruction using the first public cryptographic key and, in the case of a valid signature, creating the vehicle certificate, sending the vehicle certificate by the blockchain server to the computer system of the first owner, receiving the vehicle certificate by the computer system of the first owner, outputting the vehicle certificate by the computer system of the first owner, wherein the output vehicle certificate comprises a machine-readable code, wherein the machine-readable code identifies the program module assigned to the vehicle and comprises a second private cryptographic key of a second asymmetric key pair, wherein a second public cryptographic key of the second asymmetric key pair is identified in the blockchain as a check value for checking a signature of a read request for reading vehicle data of the vehicle certificate from the blockchain, wherein the second private cryptographic key is encrypted with a third public cryptographic key of a third asymmetric key pair identified in the blockchain, wherein the machine-readable code with the encrypted second private cryptographic key enables an owner of a third private cryptographic key of the third asymmetric key pair to validly sign read requests for reading vehicle data of the vehicle certificate from the blockchain with the second private cryptographic key.

2. The method according to claim 1, wherein the second asymmetric key pair is identical to the first asymmetric key pair.

3. The method according to claim 1, wherein the second asymmetric key pair is a key pair individual to the vehicle certificate, wherein the output instruction comprises the second public cryptographic key, and wherein the second public cryptographic key, in the case of a valid signature, is saved in the blockchain.

4. The method according to claim 1, wherein the output comprises printing the vehicle certificate using a printer.

5. The method according to claim 1, wherein the output comprises displaying the vehicle certificate on a display of a mobile portable telecommunications device.

6. The method according to claim 1, wherein the method further comprises:

capturing the machine-readable code of the output vehicle certificate with a reader of a checking computer system, creating the read request to read vehicle data of the vehicle certificate from the blockchain using the captured machine-readable code, wherein the read request comprises the identification of the program module provided by the machine-readable code, signing the read request with the second private cryptographic key provided by the machine-readable code, sending the signed read request by the checking computer system via a second communications network to a blockchain server of the blockchain network, receiving the signed read request by the blockchain server, executing, by the blockchain server, third program instructions of the program module identified by the read request, wherein executing the third program instructions comprises checking the signature of the read request using the second public cryptographic key identified by the program module and, in the case of a valid signature, reading the vehicle data of the vehicle certificate requested for reading, sending the read vehicle data by the blockchain server to the checking computer system, receiving the read vehicle data by the checking computer system, outputting the read vehicle data by the checking computer system.

7. The method according to claim 6, wherein the method further comprises decrypting the second private cryptographic key provided by the machine-readable code in encrypted form with the third private cryptographic key.

8. The method according to claim 1, wherein the method comprises:

creating a first transaction instruction for transaction of the program module from a first address assigned to the first vehicle owner, which address is assigned to the first asymmetric key pair, to a second address assigned to a second vehicle owner, signing of the first transaction instruction by the computer system of the first vehicle owner with the first private cryptographic key, sending the signed first transaction instruction by the computer system of the first vehicle owner via a third communications network to a blockchain server of the blockchain network, receiving the first transaction instruction by the blockchain server, executing, by the blockchain server, fourth program instructions of the program module identified by the transaction instruction, wherein executing the fourth program instructions comprises checking whether the first transaction instruction is validly signed with the private cryptographic key assigned to the first address and, in the case of a valid signature, adding the first transaction instruction to an additional block for the blockchain.

9. The method according to claim 1, wherein the vehicle comprises a vehicle computer system, wherein the vehicle computer system comprises a memory, wherein a fourth private cryptographic key of a fourth asymmetric key pair assigned to the vehicle is saved in the memory, wherein the vehicle computer system comprises a mobile communications interface for communication via a mobile communications network, wherein the program module identifies a fourth public cryptographic key of the asymmetric key pair assigned to the vehicle, wherein the method comprises:

receiving vehicle data of the vehicle by the vehicle computer system, creating a second data record for entry in the blockchain, wherein the second record comprises the vehicle data of the vehicle and identifies the program module assigned to the vehicle, signing the second data record by the vehicle computer system with the fourth private cryptographic key, sending the signed second data record by the vehicle computer system via the mobile communications network to a blockchain server, receiving the signed second data record by the blockchain server, executing, by the blockchain server, the first program instructions of the program module identified by the second data record, wherein executing the first program instructions comprises checking the signature of the second data record using the fourth public cryptographic key identified by the program module and, in the case of a valid signature, adding a first entry containing the signed second data record and a first timestamp to an additional block for the blockchain.

10. The method according to claim 9, wherein the vehicle comprises at least one sensor for capturing vehicle data of the vehicle, and wherein the vehicle data of the vehicle are received by the at least one sensor.

11. The method according to claim 10, wherein the vehicle data comprise the mileage of the vehicle.

12. The method according to claim 10, wherein the vehicle data comprise a fault message of the vehicle.

13. The method according to claim 10, wherein the vehicle data comprise a software ID of a software update of the vehicle computer system.

14. The method according to claim 10, wherein the vehicle data comprise an identifier assigned to a plurality of electronic components of the vehicle.

15. The method according to claim 1, wherein the vehicle computer system receives the vehicle data from a workshop's computer system, wherein the vehicle data received from the workshop's computer system is signed with a fifth private cryptographic key of a fifth asymmetric key pair assigned to the workshop, and wherein the method further comprises:

checking the signature of the data received from the workshop using a fifth public cryptographic key of the fifth asymmetric key pair assigned to the workshop, in the case of a valid signature, using the data received from the workshop to create the second data record.

16. The method according to claim 15, wherein the second data record additionally comprises a workshop ID as the origin of the vehicle data.

17. The method according to claim 16, wherein the second data record comprises, as workshop ID, the signature of the vehicle data received from the workshop's computer system.

18. The method according to claim 15, wherein the vehicle data received from the workshop's computer system comprises data regarding maintenance/repair work carried out.

19. The method according to claim 18, wherein the vehicle data received from the workshop's computer system comprises at least one vehicle part ID of a replaced vehicle part.

* * * * *